United States Patent [19]

Yoshioka et al.

[11] Patent Number: 4,876,060
[45] Date of Patent: Oct. 24, 1989

[54] CONTROL BLADE FOR NUCLEAR REACTOR

[75] Inventors: Ritsuo Yoshioka; Makoto Ueda, both of Yokohama; Yoichi Motora, Tokyo; Mitsuharu Nakamura, Yokohama, all of Japan

[73] Assignee: Kabushiki Kaisha Toshiba, Kawasaki, Japan

[21] Appl. No.: 68,190

[22] Filed: Jun. 30, 1987

[30] Foreign Application Priority Data

| Jun. 30, 1986 [JP] | Japan | 61-151567 |
|---|---|---|
| Feb. 12, 1987 [JP] | Japan | 62-28339 |
| Feb. 12, 1987 [JP] | Japan | 62-28340 |
| Mar. 4, 1987 [JP] | Japan | 62-47677 |
| Mar. 10, 1987 [JP] | Japan | 62-54986 |
| Mar. 31, 1987 [JP] | Japan | 62-78171 |

[51] Int. Cl.⁴ .............................................. G21C 7/10
[52] U.S. Cl. ..................................... 376/333; 376/327
[58] Field of Search ................................. 376/327, 333

[56] References Cited

U.S. PATENT DOCUMENTS

| 3,115,452 | 12/1963 | Rock | 376/327 |
|---|---|---|---|
| 3,121,045 | 2/1964 | Harris et al. | 376/327 |
| 3,234,104 | 2/1966 | Gale et al. | 376/327 |
| 3,255,086 | 6/1966 | Hitchcock | 376/333 |
| 3,332,850 | 7/1967 | Jonsson et al. | 376/327 |
| 4,451,428 | 5/1984 | Nishimura et al. | 376/333 |
| 4,655,999 | 4/1987 | Maruyama et al. | 376/333 |
| 4,676,948 | 6/1987 | Cearley et al. | 376/333 |

FOREIGN PATENT DOCUMENTS

| 0066190 | 6/1977 | Japan | 376/333 |
|---|---|---|---|
| 0159585 | 12/1979 | Japan | 376/327 |
| 57-80592 | 5/1982 | Japan . | |
| 57-91487 | 6/1982 | Japan . | |
| 57-96289 | 6/1982 | Japan . | |
| 58-55886 | 4/1983 | Japan . | |
| 58-55887 | 4/1983 | Japan . | |
| 58-147687 | 9/1983 | Japan . | |
| 0060285 | 4/1984 | Japan | 376/327 |
| 0192992 | 11/1984 | Japan | 376/333 |
| 60-60585 | 4/1985 | Japan . | |
| 0170790 | 9/1985 | Japan | 376/333 |
| 0220893 | 11/1985 | Japan | 376/333 |

Primary Examiner—Harvey E. Behrend
Attorney, Agent, or Firm—Oblon, Spivak, McClelland, Maier & Neustadt

[57] ABSTRACT

In the field of commercial nuclear reactors, there is an increasing demand for long-life control blades in order to meet the requirements of higher economy and reduction in the disposal of radioactive wastes. A control blade proposed by the invention stands a long use by virtue of the use of a long-life neutron absorber which is typically made of hafnium. Despite the use of hafnium which has a large specific weight ($13.3$ g/cm$^3$), the size, shape and weight of the control blade are substantially the same as those of convertional control blades which employ boron carbides $B_4C$ as the neutron absorber, so that the control blade can be back-fitted in existing boiling water reactors without difficulty. The control blade of this invention is a flux-trap-type control blade in which long-life neutron absorber plates or sheets are arranged to oppose each other in the thicknesswise direction of the wing within the sheath plate such that a water gap is preserved between the opposing neutron absorber plates, so that the weight of the hafnium, which occupies most part of the total weight of the control blade, is reduced by an amount corresponding to the volume of the water gap. The thickness of the neutron absorber plates or sheets is increased at the upper portion of the control blade where the neutron exposure is specifically high and where a large neutron absorption power or capacity is required for ensuring a sufficient reactor shut-down margin, while the thickness is reduced in other portions so as to increase the size of the water gap. In consequence, the weight of the control blade incorporating heavy hafnium as the neutron absorber is reduced almost to the same level as that of ordinary control blades, without being accompanied by any reduction in the reactivity worth.

23 Claims, 36 Drawing Sheets

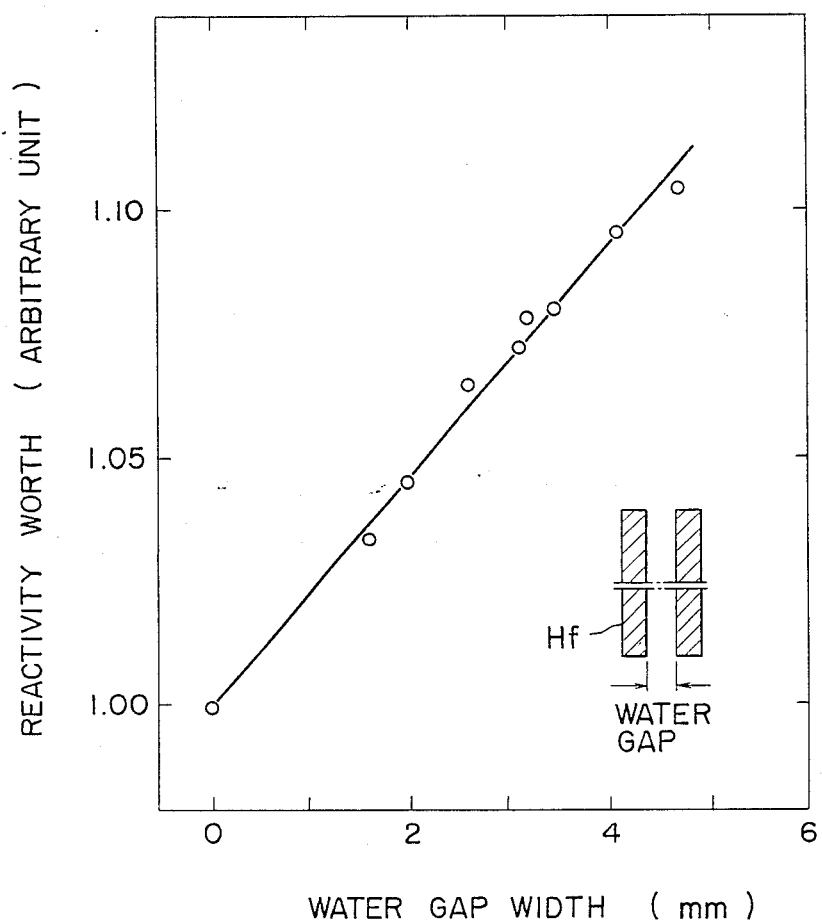
F I G. 11

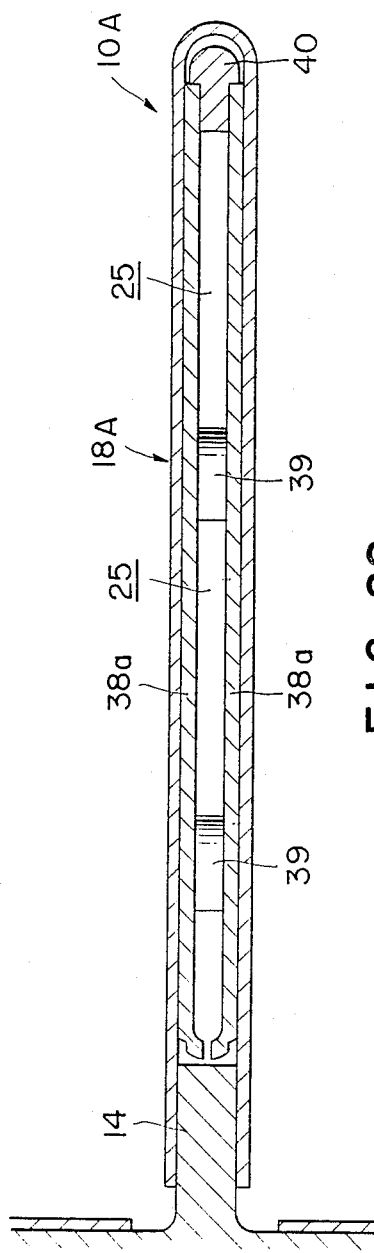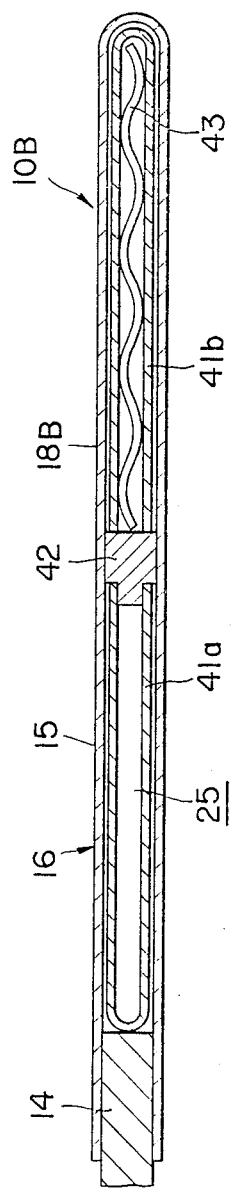
FIG. 22
FIG. 23

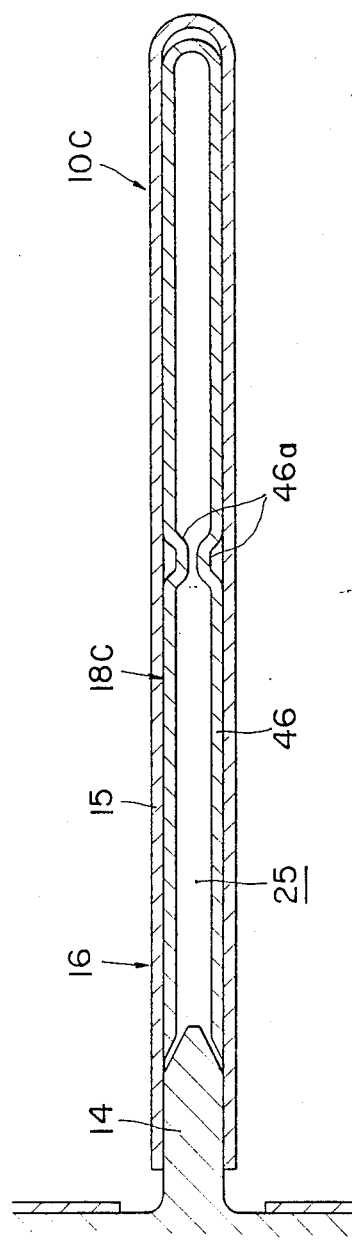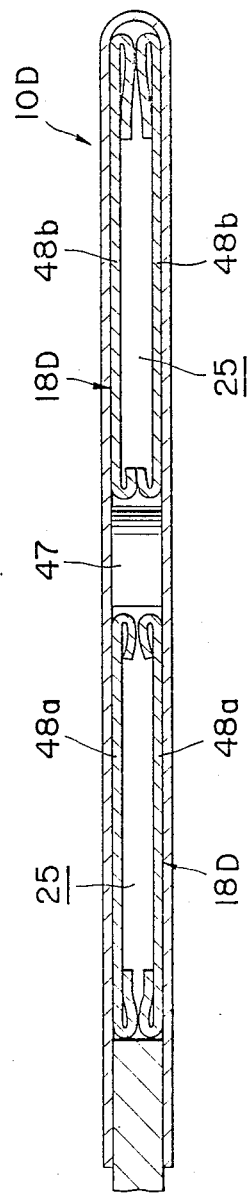
FIG. 24
FIG. 25

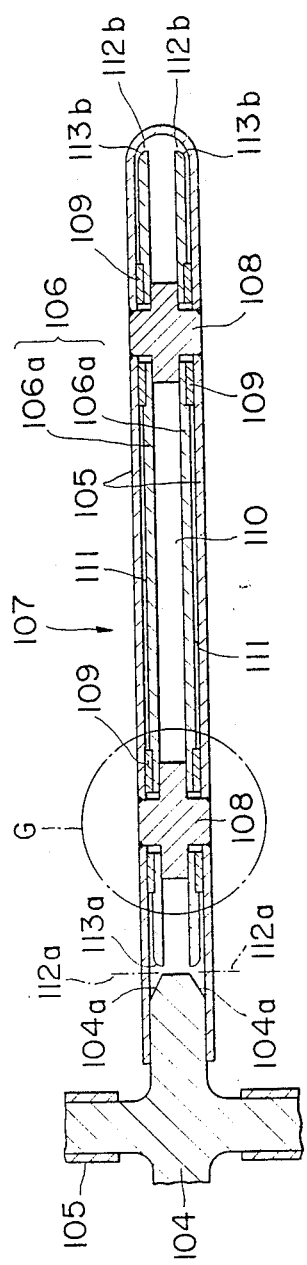
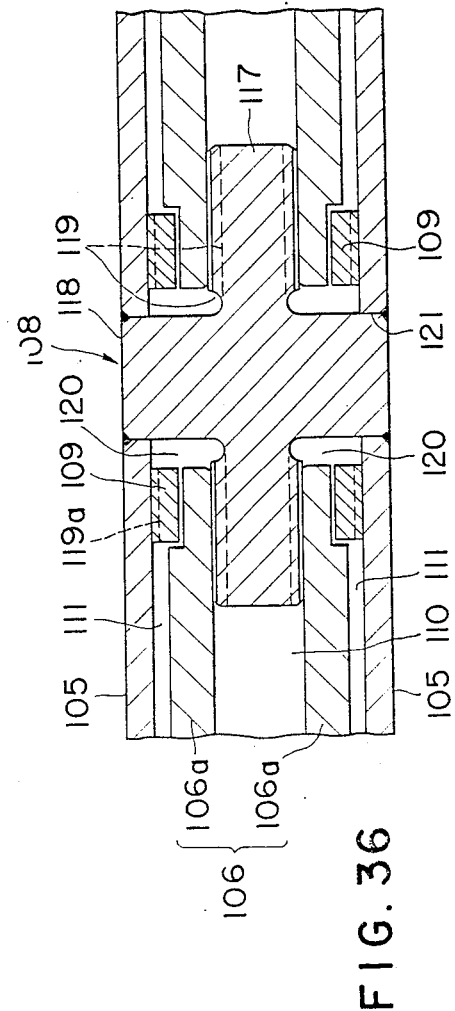
FIG. 35
FIG. 36

(A)
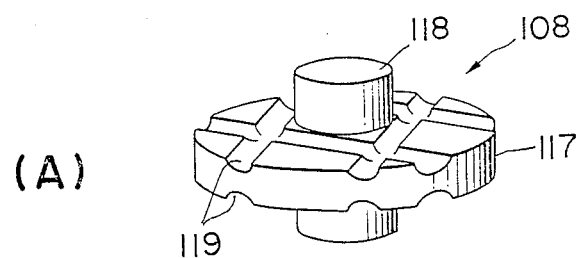
(B)
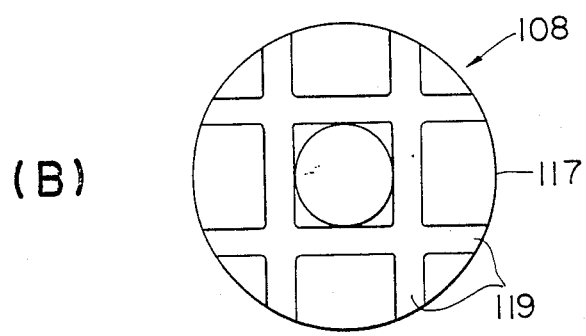
(C)
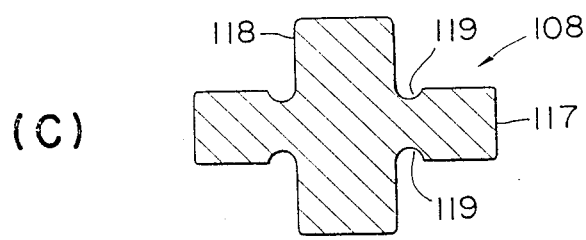
F I G. 37

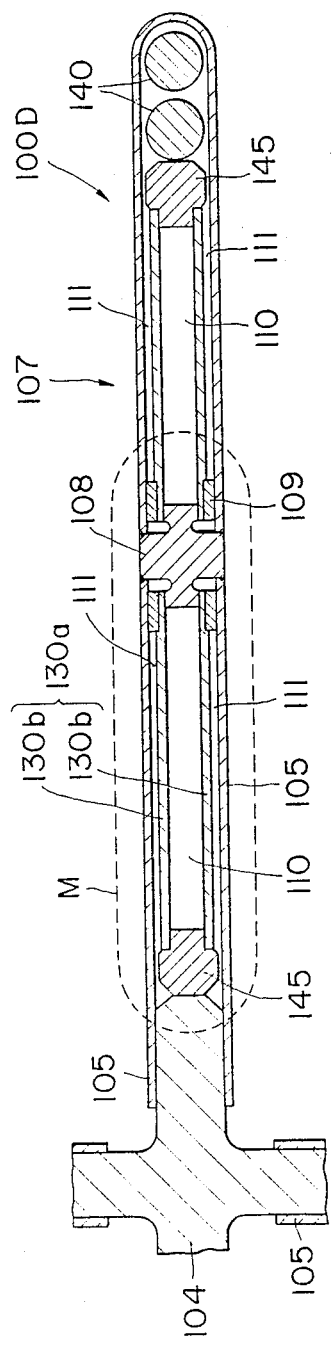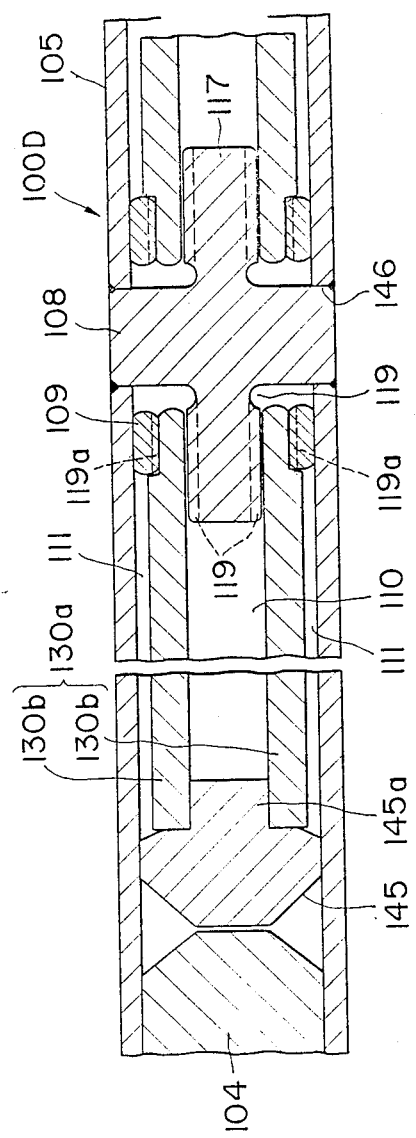
FIG. 51
FIG. 52

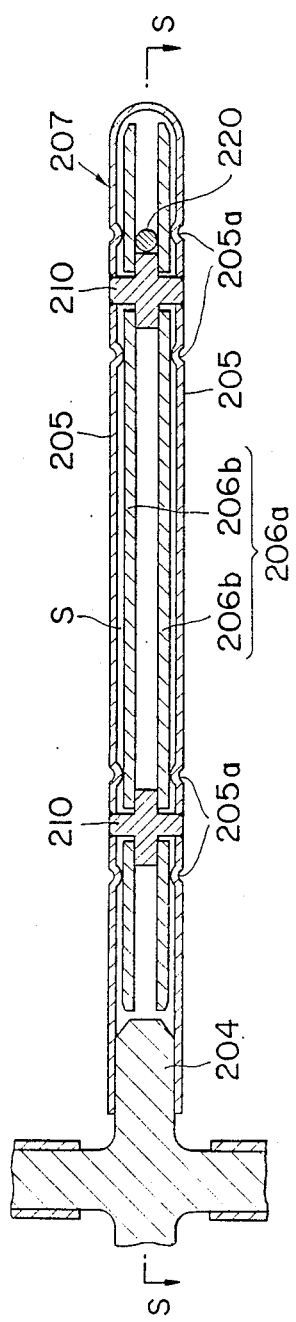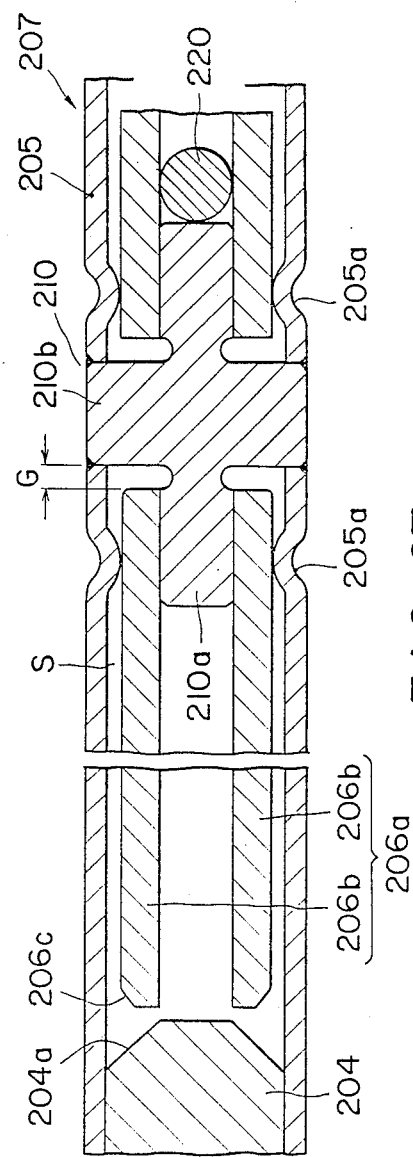
FIG. 65
FIG. 67

CONTROL BLADE FOR NUCLEAR REACTOR

BACKGROUND OF THE INVENTION

The present invention relates to a control blade for use in a nuclear reactor which is adapted to be inserted into and extracted from a nuclear reactor core for the purpose of controlling the power of the nuclear reactor. More particularly, the invention is concerned with a long-life flux-trap type control blade suitable for use in a boiling water reactor (BWR).

In general, a control blade for use in a boiling water reactor has a central tie rod and a plurality of wings formed by U-shaped sheath plates attached to the tie rod, each wing containing a multiplicity of neutron absorber rods. Each neutron absorber rod is composed of a clad tube made of a steel such as stainless steel and grain of boron carbide ($B_4C$) charged in the clad tube. In order to prevent the grain of boron carbides from moving freely within the clad tube, partition balls are placed at a predetermined interval within the clad tube.

The boron carbides in the form of grain charged in the neutron absorber rod progressively decreases its neutron absorption power (capacity) due to absorption of neutrons, and generates He gas as a result of reaction between boron-10 ($^{10}B$) and neutrons resulting in a rise of the pressure within the clad tube. The lifetime of the control blade determined by the neutron absorption power is referred to as "nuclear lifetime", while the lifetime determined by the internal gas pressure of the clad tube is referred to as "mechanical lifetime".

The control blade, which is adapted to be inserted into and extracted from the nuclear reactor core, is not uniformly exposed to neutrons. For instance, the rate of neutron exposure rate is high at the side edges and upper end of each wing. This means that these portions of the control blade absorb greater amounts of neutron than other portions of the control blade and, therefore, the nuclear lifetime is reached earlier in these portions than in other portions of the control blade. In consequence, the control blade has to be disposed of as a radioactive waste, even though sufficient lifetime is left in other portions thereof.

In order to obviate this problem, the present inventors have developed an improved control blade in which long-life neutron absorbers are disposed in the vicinity of side edges of wings where the degree of neutron exposure is high, as disclosed in Japanese Patent Laid-Open No. 74697/1978. This improved control blade, however, is still unsatisfactory from the view point of prolongation of lifetime of control blades, because it exhibits a lifetime which is only twice as long as that of ordinary control blades containing $B_4C$.

In order to cope with the demand for prolongation of lifetime of control blades, the present inventors have developed a long-life control blade capable of operating much longer than the above-mentioned improved control blade. This long-life control blade has, as disclosed in Japanese Patent Laid-Open No. 55887/1983, solid neutron absorption plates made of a long-life neutron absorber and disposed in each wing thereof. The neutron absorption plate has apertures or recesses whose sizes and distribution are so determined that the amount of material removed by the presence of such apertures or recesses is comparatively small in the portion where the axial distribution of the shut down margin is small and is comparatively large in the portion where the axial distribution of the shut down margin is large.

This long-life control blade, however, suffers from the following disadvantage, due to the use of hafnium (Hf) sheet as the neutron absorber. Namely, hafnium is expensive and has a large specific gravity (13.3 $g/cm^3$) so that the cost and the weight of the control blade are increased undesirably. The increased weight of the control blade in turn requires a design of a control rod drive mechanism which can safely operate such heavy control blades because conventional control rod drive mechanism cannot withstand such heavy weight of the control blades.

The inventors, however, have confirmed that there still is a margin for the removal of material in the hafnium sheet which is used as long-life neutron absorber for the purpose of reducing the weight of the hafnium sheet, and that ordinary control blade drives are still usable provided that the weight of the control blade is reduced by the removal of the material.

SUMMARY OF THE INVENTION

Accordingly, an object of the present invention is to provide a long-life control blade for use in a nuclear reactor such as BWR in which the weight of the long-life neutron absorber and, hence, the overall weight of the control blade are effectively reduced so as to enable conventional control rod drive mechanism to safely drive such a long-life control blade, thereby overcoming the above-described problems of the prior art.

Another object of the present invention is to provide a long-life control blade having almost the same size, shape and total weight as those of ordinary $B_4C$ control blades and, hence, usable in existing boiling water reactors.

Still another object of the present invention is to provide a long-life control blade for nuclear reactors, suitable for use in operation of the reactor at a high burn-up and in long-term operation of the reactor.

A further object of the present invention is to provide a long-life control blade for nuclear reactors, which is improved in such a way as to effectively avoid damaging due to electrochemical corrosion.

A still further object of the present invention is to provide a hybrid-type long-life control blade for nuclear reactors, which is improved in such a way as to avoid damaging due to electrochemical corrosion and to increase mechanical strength so as to exhibit greater resistance to deformation by any external force.

A still further object of the present invention is to provide a long-life control blade for nuclear reactors, which is improved such as to exhibit a greater resistance to buckling while reducing the weight of sheaths, thus reducing the total weight of the control blade.

According to the present invention, these and other objects can be achieved in one aspect by providing a control blade for nuclear reactors comprising: an upper structure; a lower structure; a central tie rod having radial projections and interconnecting the upper and lower structures together; and wings composed of sheath plates each having a substantially U-shaped cross-section and secured to the end of each projection of the central tie rod, and long-life neutron absorber charged in each of the sheath plate; wherein the neutron absorber in each sheath is divided into a plurality of neutron absorber elements (sections) along the axis of the central tie rod, each neutron absorber element (section) being composed of neutron absorber plates spaced from and opposing each other such that a water gap for guiding the flow of a moderator is defined between these neutron absorber plates.

In this control blade, the reactivity worth is increased by virtue of the water gap for guiding the flow of a moderator (coolant) between the opposing neutron absorber plates. The provision of the water gap also enables the thickness of the neutron absorber plates to be reduced in accordance with the amount of the neutron exposure. For these reasons, the control blade can have almost the same size, shape and weight as those of ordinary $B_4C$ type control blades, even though a heavy long-life neutron absorber such as hafnium sheets is used. Therefore, the control blade can be used in existing nuclear reactors without requiring modification of the control rod drive mechanism, and can operate for a period which is much longer than those offered by known control blades.

In another aspect, the present invention provides, in order to avoid any electrochemical corrosion due to contact between different metals, a control blade for nuclear reactors comprising: an upper structure; a lower structure; a central tie rod having radial projections and interconnecting the upper and lower structures together; and wings composed of sheath plates each having a substantially U-shaped cross-section and secured to the end of each projection of the central tie rod, and long-life neutron absorber charged in each of the sheath plate; wherein the neutron absorber in each wing is composed of a plurality of neutron absorber plates such as of hafnium which are spaced from each other in the thicknesswise direction of the wing by means of supporting spacers, such that a water gap for guiding the flow of a moderator is defined between opposing neutron absorber plates, and wherein a water passage is formed between the external surface of each neutron absorber plate and the adjacent inner surface of the sheath.

In still another aspect, the present invention provides, in order to prevent buckling through enhancement of strength to lateral bending force, a control blade for nuclear reactors comprising: an upper structure; a lower structure; a central tie rod having radial projections and interconnecting the upper and lower structures together; and wings composed of sheath plates each having a substantially U-shaped cross-section and secured to the end of each projection of the central tie rod, and long-life neutron absorber charged in each of the sheath plate; wherein the neutron absorber in each wing is divided into a plurality of neutron absorber elements along the axis of the tie rod, each the element being composed of a plurality of neutron absorber plates spaced from and opposing each other; and wherein a plurality of spacers are disposed between the opposing neutron absorber plates such that a linear flow passage for a moderator is defined so as to extend in the axial direction of the tie rod, the spacers being arranged at a substantially constant interval along the axis of the tie rod but the interval is slightly reduced in the regions between adjacent neutron absorber plates.

These and other objects, features and advantages of the present invention will become clear from the following description of the preferred embodiments when the same is read in conjunction with the accompanying drawings.

BRIEF DESCRIPTION OF THE DRAWINGS

FIG. 11 is a diagram showing the relationship between water gap width and reactivity worth as confirmed through a critical experiment conducted by inserting the control blade in a boiling water reactor core simulator;

FIG. 22 is a sectional plan view of a wing in the second embodiment of the control blade of the invention;

FIGS. 23 to 31 are sectional plan views of wings of third to eleventh embodiments of the control blade in accordance with the present invention;

FIG. 35 is a sectional view taken along the line F—F of FIG. 34;

FIG. 36 is a sectional view showing the detail of a portion marked at G in FIG. 35;

FIGS. 37A, 37B and 37C are a perspective view, a plan view and a sectional view, respectively, of a supporting spacer shown in FIG. 36;

FIG. 51 is a sectional view taken along the line L—L of FIG. 50;

FIG. 52 is a view showing the detail of a portion marked at M in FIG. 51;

FIG. 65 is a sectional view taken along the line R—R of FIG. 64;

FIG. 67 is an enlarged cross-sectional view of a portion of the embodiment shown in FIG. 65.

DESCRIPTION OF THE PREFERRED EMBODIMENTS

Figure 1:
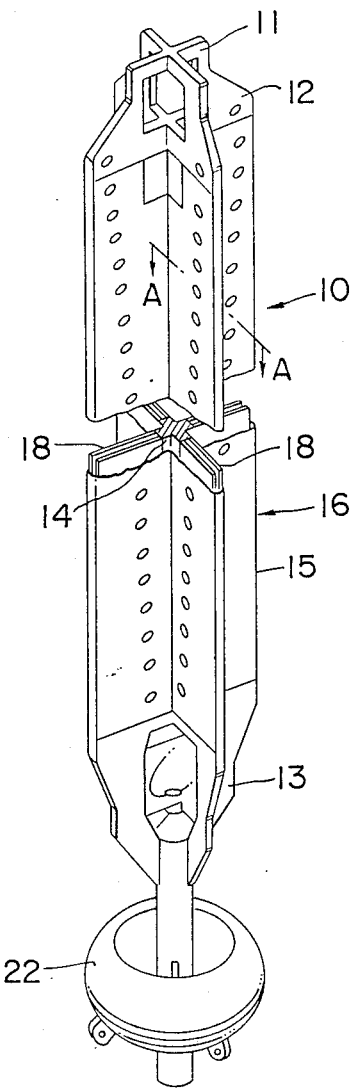
FIG. 1 is an overall perspective view of an embodiment of a nuclear reactor control blade in accordance with the present invention.

Referring to FIG. 1 which is a perspective view of a first embodiment of the control blade of the invention for use in nuclear reactors, the control blade generally denoted by a numeral 10 has a central tie rod 14 interconnecting an upper structure 12 provided with a handle 11 and a lower structure 13. The central tie rod 14 has radial projections which provide a substantially cross-shaped cross-section of the central tie rod 14. A substantially U-shaped sheath plate having a considerable depth and made of stainless steel is secured to the end of each projection of the central tie rod 14. The space in each sheath plate 15 receives plate-shaped long-life neutron absorber 18 made of hafnium (Hf). Each sheath 15 and the long-life neutron absorber 18 in combination constitute a wing 16 of the control blade 10. Thus, the control blade 10 has four wings 16.

The control blade 10 is designed to have substantially the same size, shape and weight as those of conventional control blades charged with boron carbide ($B_4C$), so that it can be back-fitted in existing nuclear reactors. For instance, the control blade 10 has an effective length of about 3.83 m, a blade width of about 250 mm, a blade thickness of about 8 mm, a sheath plate thickness of about 1 mm and a total weight of about 100 kg.

Figure 2:
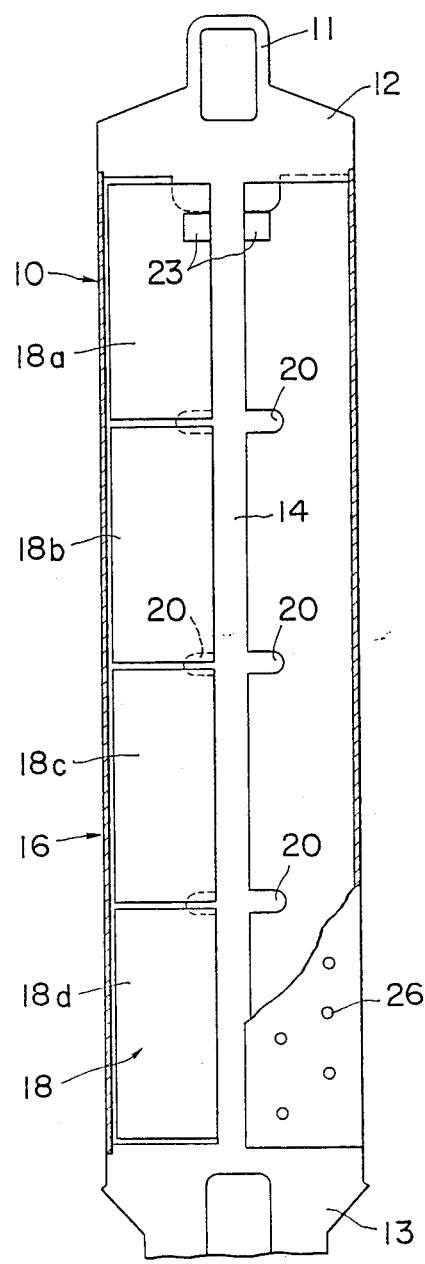
FIG. 2 is a view illustrating the manner in which neutron absorber members are incorporated in the control blade.

The neutron absorber 18 is divided along the axis of the tie rod 14 into a plurality of elements or sections, e.g., four neutron absorber elements or sections 18a, 18b, 18c and 18d as shown in FIG. 2. In FIG. 2, the left half part of the control blade 10 is loaded with the neutron absorber elements, while the right half part is shown in a state not loaded with the neutron absorber elements. The neutron absorber elements 18a, 18d and 18c other than the element 18d adjacent to the lower structure 13 are supported by absorber element supports 20 which are formed on each central tie rod 14 at a suitable interval in the direction of axis of the central tie rod 14 and fit in recesses of the absorber elements so as to prevent the neutron absorber elements 18a to 18c from moving up and down.

Figure 3:
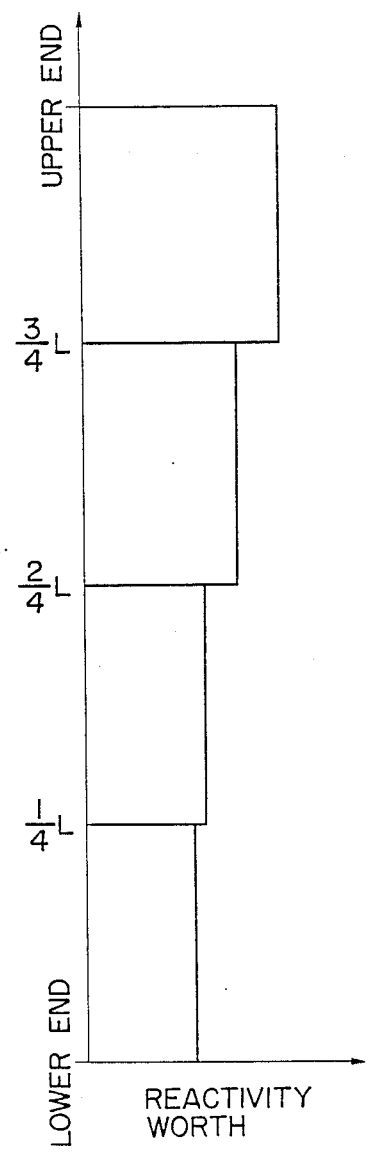
FIG. 3 is an illustration of reactivity worth (neutron absorption characteristic) distribution of the control blade in the heightwise direction of the latter.

The neutron absorber elements 18a to 18d are so designed that the neutron absorber 18 composed of these elements exhibits neutron absorption characteristics which are progressively decreased from the end adjacent to the upper structure 12 towards the end adjacent to the lower structure 13. More particularly, in the illustrated embodiment in which the neutron absorber 18 is divided into four elements 18a to 18d, each element has a constant thickness but the thicknesses are changed in a stepped manner such that the uppermost neutron absorber element 18a adjacent to the upper structure has the greatest thickness and the lowermost neutron absorber element adjacent to the lower structure has the smallest thickness. This stepped change in the thickness of the neutron absorber 18 causes a correspondingly stepped change in the reactivity value or worth, i.e., the neutron absorption characteristics, as shown in FIG. 3. The design may be such that, depending on the design or the manner of operation of the control blade, the extreme end portion of the uppermost neutron absorber element 18a adjacent to the upper structure, e.g., the region within 35 cm as measured from the end extremity, has specifically increased neutron absorption characteristics so as to improve the scramming performance of the reactor or specifically decreased neutron absorption characteristic so as to suppress any drastic variation of the reactor output which may be caused when the control blade is extracted. In addition, the neutron absorption characteristics are so varied in at least the uppermost neutron absorber element 18a such that the portion of the element adjacent to the central tie rod 14 has greater neutron absorption capacity.

In general, a long-life control blade 10 used in a nuclear reactor tends to suffer from embrittlement of the upper structure 12 because of an extremely heavy neutron exposure of the upper structure. Therefore, the upper structure is usually made of a stainless steel having a specifically high purity, so as to suppress any tendency for the upper structure to become fragile. In order to minimize the weight of the control blade, the upper structure 12, the lower structure 13 and a speed limiter 22 attached to the lower structure have thicknesses reduced as possible. As will be seen from FIGS. 1 and 2, the control blade 10 has a vacant portion 23 below the upper structure 12. This vacant portion 23 may be utilized as an auxiliary handle. The vacant portion 23 is formed at such a position where no neutron absorption is necessary due to the design of the control blade.

The provision of the vacant portion 23 contributes to a further reduction in the weight of the control blade.

It has been confirmed through experiments that the amount of fast neutron exposure at the upper part of the auxiliary handle is as small as 1/5 to ⅓ of that at the upper part of the handle portion. This suggests that the degree of embrittlement at the auxiliary handle portion 23 is as small as 1/5 to ⅓ of that at the upper part of the handle portion, so that the provision of the auxiliary handle portion 23 provides an effective back-up for the handle 11 during handling of the control blade.

Figure 4:
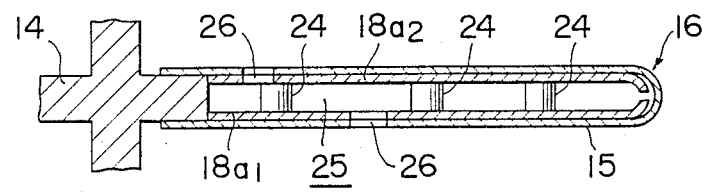
FIG. 4 is a fragmentary sectional plan view taken along the line A—A in FIG. 1.

Each of the neutron absorber elements, e.g., element 18a, disposed in the sheath plate 15 is composed of a pair of neutron absorber plates or sheets $18a_1$ and $18a_2$ made of hafnium films or sheets and arranged so as to oppose each other as shown in FIG. 4. These neutron absorber plates $18a_1$ and $18a_2$ are spaced from each other by spot-like spacers 24. These spacers 24 improve the mechanical strength of the neutron absorber element 18a and preserve a flat water gap 25 between the opposing neutron absorber plates $18a_1$ and $18a_2$ for allowing a moderator to flow therethrough. A plurality of water passage holes 26 communicating with the water gap 25 are formed in the walls of the sheath plate 15 and the corresponding portions of the neutron absorber element 18a. The water passage holes 26 as a rule are not formed in such a way as to penetrate the wing 16 linearly. In other words, these holes 26 are formed in a staggered manner.

Each of the neutron absorber plate in each of the elements 18a to 18d has the form of a thin plate or sheet of 0.5 to 2.0 mm thick and is curved at its edge extending along the end of the wing 16. A small gap is formed between the curved end extremities of the pair of neutron absorber plates $18a_1$ and $18a_2$ at the end of the wing 16, in order to ensure sufficient flexibility of these neutron absorber plates $18a_1$ and $18a_2$.

Figure 5:
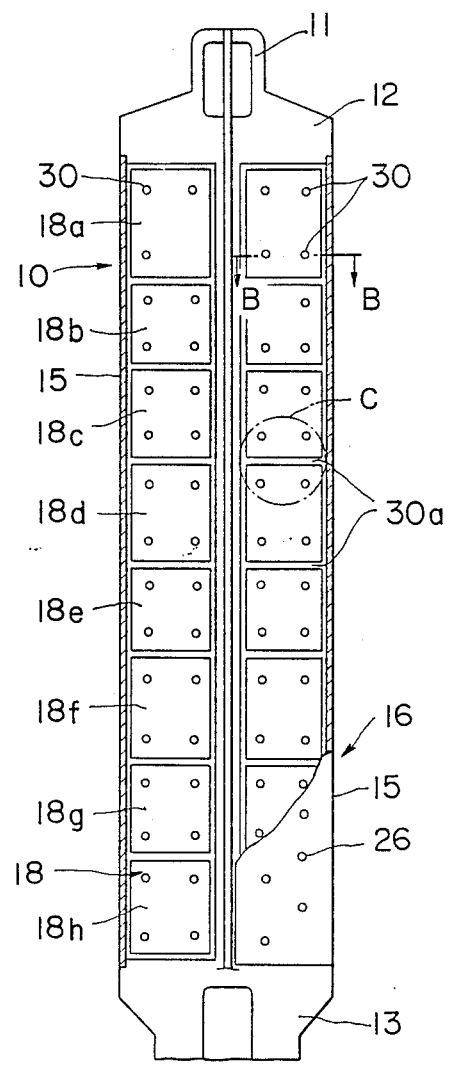
FIG. 5 is a view illustrating a neutron absorber incorporated in a control blade and divided into eight elements along the length of the control blade.

The neutron absorber 18 incorporated in the nuclear reactor control blade 10 of the invention may be sectioned in the axial direction of the tie rod 14 into eight stages or elements 18a to 18h, as shown in FIG. 5. The neutron absorber supporting element of each stage is supported by a plurality of supporting spacers 30 which are fixed to the sheath plate 15 at a suitable interval as shown in FIG. 5, thereby preventing the neutron absorber elements 18a to 18h from moving up and down.

The neutron absorber elements 18a to 18h are so designed that the neutron absorber 18 composed of these elements exhibits neutron absorption characteristics which are progressively decreased from the end adjacent to the upper structure 12 towards the end adjacent to the lower structure 13. More particularly, in this embodiment in which the neutron absorber 18 is divided into eight elements 18a to 18h, each element has a constant thickness but the thickness is changed in a stepped manner such that the uppermost neutron absorber element 18a adjacent to the upper structure has the greatest thickness and the lowermost neutron absorber element 18h adjacent to the lower structure has the smallest thickness. This stepped change in the thickness of the neutron absorber 18 causes a correspondingly stepped change in the reactivity worth, i.e., the neutron absorption characteristics, as shown in FIG. 6A.

Figure 6:
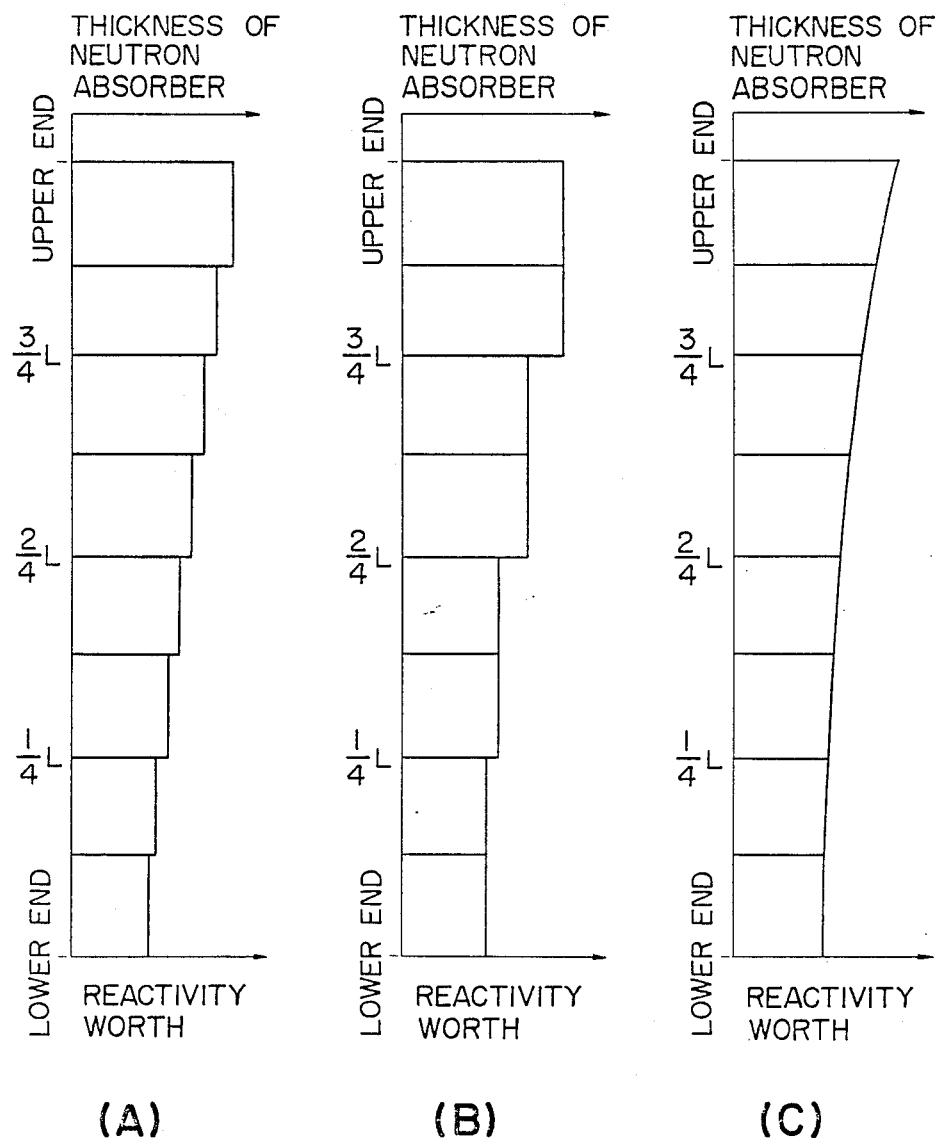
FIGS. 6A to 6C are illustrations of levels of the reactivity worth at different heights of the control blade.

In the arrangement shown in FIG. 6A, all the neutron absorber elements 18a to 18h have different thicknesses such that the neutron absorber 18 as a whole exhibits a thickness distribution which progressively decreases towards the end adjacent to the lower structure. This, however, is not exclusive and the thickness distribution may be such that a plurality of adjacent neutron absorber elements, e.g., two elements as shown in FIG. 6B, have an identical thickness, or such that each of the neutron absorption elements has the greatest thickness at its end adjacent to the upper structure 12 and the smallest thickness at its end adjacent to the lower structure 13, so that the neutron absorber 18 as a whole exhibits a substantially linear or rectilinear change in the thickness as shown in FIG. 6C. It is also possible to use the arrangements shown in FIGS. 6A to 6C in combination.

Figure 7:
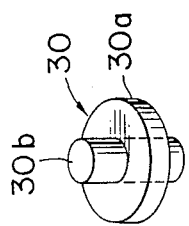
FIG. 7 is a view illustrating supporting spacer which supports each neutron absorber section.
Figure 8:
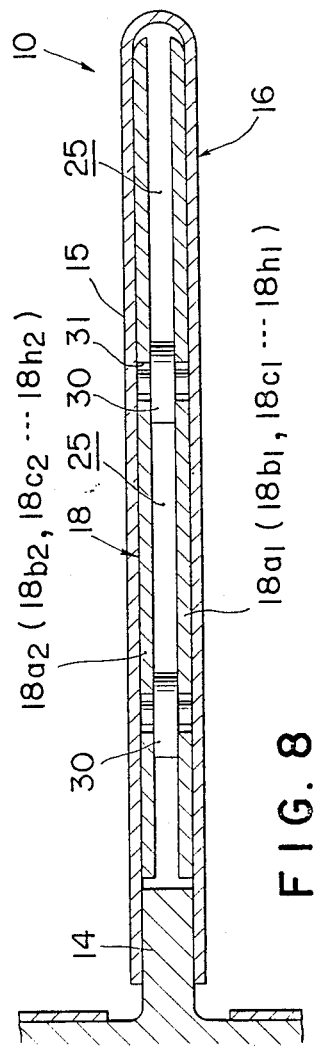
FIG. 8 is a fragmentary sectional view taken along the line B—B of FIG. 5.

As shown in FIG. 8, the neutron absorber elements 18a to 18h of the respective stages have pairs of neutron absorber sheets or plates $18a_1$, $18a_2$; $18b_1$, $18b_2$; . . . ; $18h_1$, $18h_2$ constituted by sheets of hafnium, the neutron absorber plates of each pair being arranged to oppose each other in the direction of thickness of the wing 16. These neutron absorber plates of each pair are spaced from each other by supporting spacers 30 which has, as shown in FIG. 7, a disk-like spacing portion 30a and supporting legs 30b projecting axially from the center of the spacing portion 30a at both sides thereof. As will be seen in FIG. 8, the supporting legs 30b loosely penetrate corresponding holes in the opposing neutron absorber plates $18a_1$ and $18a_2$ for example and are fixed to the inner wall surfaces of the sheath 15 by, for example, welding.

Figure 9:
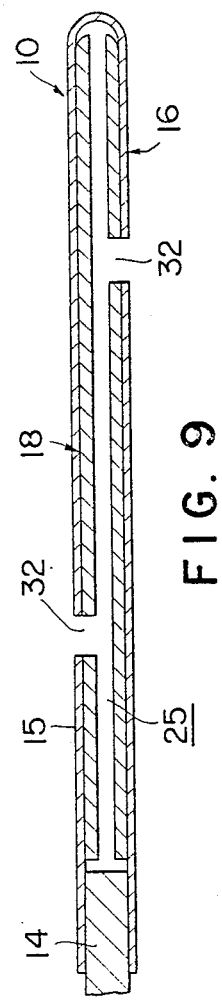
FIG. 9 is a plan view corresponding to FIG. 4.

The holes 31 formed in the opposing neutron absorber plates of each neutron absorber element have a diameter which is slightly greater than the supporting legs 30b so as to allow thermal expansion or contraction of the neutron absorber plates caused by a change in the temperature. These supporting spacers 30 securely hold the neutron absorber plates such as the plates $18a_1$, $18a_2$ within the sheath while preserving a flat water gap 25 between these opposing neutron absorber plates $18a_1$, $18a_2$ so as to guide the flow of a moderator. Thus, the water gap 25 provides a flow passage for the moderator. A plurality of water passages 26 communicating with the water gap 25 are formed in the walls of the sheath 15 and the corresponding portions of the neutron absorber element of each stage of the neutron absorber 18. As a rule, the water passage holes 26 are arranged such that the wing 16 is not penetrated linearly, i.e., in a staggered or zig-zag manner as shown in FIG. 9.

In this embodiment, the thickness of each wing 16 of the nuclear reactor control blade 10 is about 8 mm, and each neutron absorber plate constituting each of the neutron absorber elements $18a$ to $18h$ is constituted by a metallic neutron absorber plate having a very small thickness of, for example, 0.5 to 2.0 mm. With this arrangement, as shown in FIG. 6A, the neutron absorber plate in the neutron absorber element adjacent to the upper structure 12 has a thickness of 1.5 to 2.0 mm, while the neutronabsorber plate in the neutron absorber element adjacent to the lower structure has a thickness of 0.5 to 1.0 mm. The neutron absorber plates in the intermediate neutron absorber elements have intermediate thicknesses.

A critical experiment was conducted by inserting an experimental flux-trap-type control blade into a BWR core simulator. The control blade used in this experiment was composed of pairs of hafnium plates as the neutron absorbers arranged in each sheath made of stainless steel with a water gap formed between opposing hafnium plates, as shown in FIGS. 8 and 9.

A relationship between the water gap width and the reactivity worth was confirmed through the experiment, as shown in FIG. 11. This experimental result teaches that a large flux trapping effect is obtained even with a small water gap width of 2 to 5 mm. It will be noted also that a reduction in the thickness of the hafnium plate increases the water gap width correspondingly, thus enabling any reduction in the reactivity worth due to reduction in the plate thickness to be compensated to a certain extent.

From these facts, it is understood that a reduction in the weight of the control blade is attainable, while maintaining high reactivity worth, by enlarging the water gap width through reducing the thickness of the hafnium plate at portions of the control blade other than the upper portion where a specifically large hafnium plate thickness is required in view of the neutron exposure distribution and in consideration of the reactor shut down margin.

Figure 10:
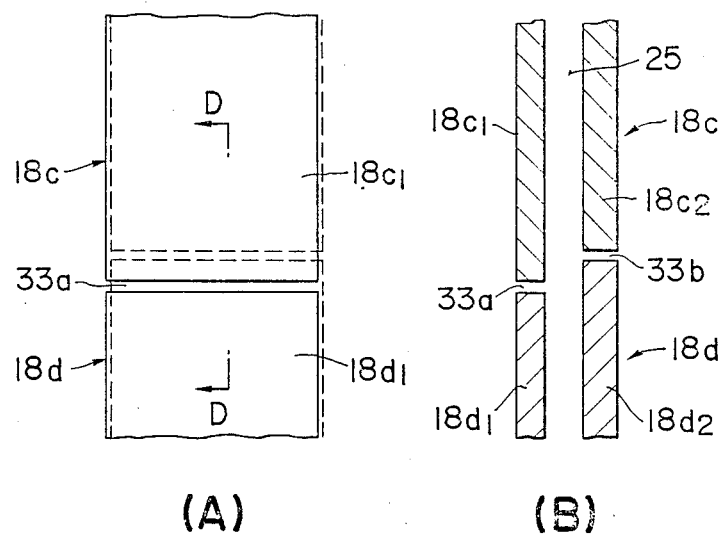
FIG. 10A is an enlarged fragmentary view illustrating a portion marked by C in FIG. 5.
FIG. 10B is a sectional side elevational view taken along the line D—D of FIG. 10A.

FIGS. 10A and 10B show the portion marked at C in FIG. 5 with the supporting spacers removed. FIG. 10B shows a section taken along the line D—D in FIG. 10A. It will be seen that gaps $33a$, $33b$ are formed between the adjacent neutron absorber plates $18a_1$, $18a_2$; $18b_1$, $18b_2$; ... $18h_1$, $18h_2$ of the successive neutron absorber elements $18a$, $18b$, ... $18h$ arranged in the axial direction of the Control blade 10. It will also be seen that the gaps $33a$ and the gaps $33b$ on opposite side of the water gap are staggered such that they are masked by the neutron absorber plates. Namely, the gaps $33a$ and the gaps $33b$ formed between the adjacent neutron absorber elements at both sides of the water gap are arranged in a staggered manner such that these gaps are masked by the neutron absorber plates on the opposite sides of the water gap and such that the adjacent gaps on both sides of the water gap do not occupy the same plane of a level.

Figures 12, 13, 14:
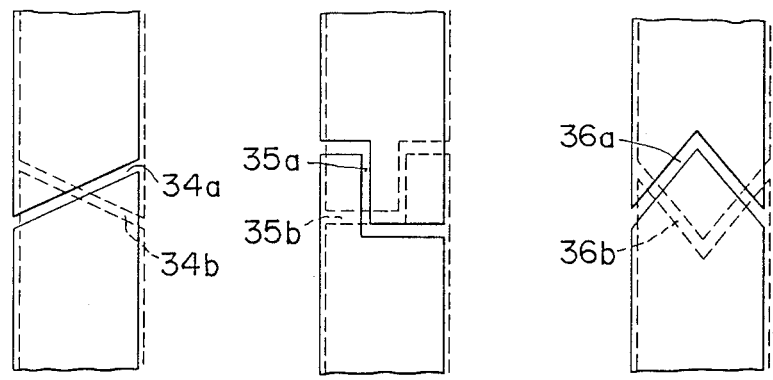
FIGS. 12 to 14 are illustrations of different forms of arrangement of neutron absorber.

FIGS. 12 to 14 show modifications of the arrangement of neutron absorber plates in adjacent neutron absorber elements. In these modifications, the gaps $34a$, $35a$, $36a$ formed in the front side of the wing are disposed so as to intersect, when viewed in the direction normal to the plane of the wing, the gaps $34b$, $35b$, $36b$ formed in the rear side of the wing, in such a manner that the areas over which the gaps on the front and rear side cross each other are minimized. By minimizing these areas, it is possible to avoid any local reduction in the reactivity worth along the length of the control blade. Other modifications of the shape and position of the gaps between the adjacent neutron absorber elements will be obvious to those skilled in the art.

The operation of the described embodiment of the nuclear reactor control blade is as follows.

Figure 15:
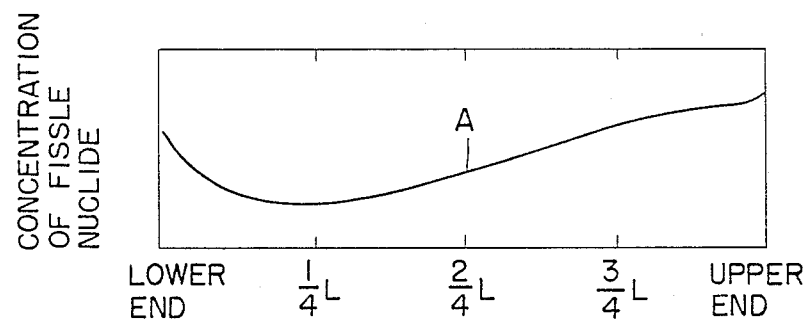
FIG. 15 is a graph showing fissile nuclides concentration distribution in a reactor core along the axis of the reactor core.

A curve as shown in FIG. 15 exemplarily shows the fissile nuclide concentration distribution along the axis of a boiling water reactor core in which the fuel has been burnt up to a certain degree. Since the control of burn-up in the reactor core is divided into four sections in the direction of axis of the reactor core, it is convenient that the control blade 10 for controlling the burn-up also is divided into four sections or sections of a number which is a multiple of four.

Figure 16:
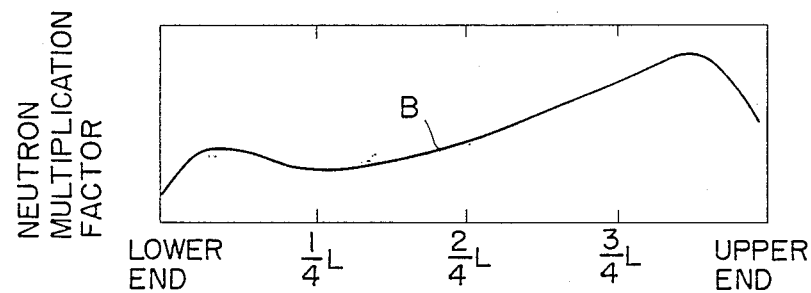
FIG. 16 is a graph showing neutron multiplication factor distribution in a reactor core along the axis of the reactor core.

The burn-up of fuel is comparatively slow in the lower end portion of the core of the nuclear reactor, so that the concentration of fissile nuclides is large in this portion of the nuclear reactor. Representing the axial length of the reactor core by L, the upper portion above the mid portion 2/4.L experiences a phenomenon known as hardening of neutron spectrum due to voids generated in this portion. As a result, the plutonium production reaction is promoted in this portion. At the same time, the voids reduce the thermal neutron flux so as to retard the burning of the fuel. For these reasons, the reactor core usually exhibits the fissile nuclide distribution pattern as shown in FIG. 15.

Where the fissile nuclide distribution pattern as shown in FIG. 15 is exhibited by the reactor core, the reactor core in the shut-down state shows a neutron multiplication factor distribution along the axis of the reactor core as shown by a curve B in FIG. 16. In general, the greater the neutron multiplication factor, the smaller the reactor shut-down margin, i.e., the smaller the subcriticality factor. The reduction in the multiplication factor at the lower and upper ends of the reactor core as shown by curve B is attributable to leakage of neutrons at these portions of the reactor core.

Figure 17:
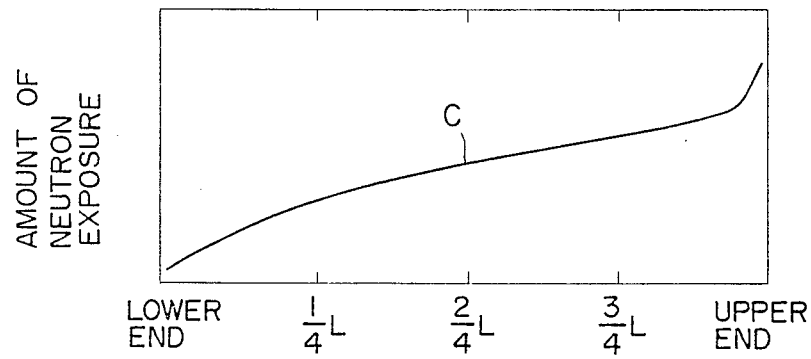
FIG. 17 is a graph showing neutron exposure distribution along the axis of the control blade.

In FIG. 17, a curve C shows the distribution of amounts of the neutron exposure of the nuclear reactor control blade along the axis of the reactor control blade, as observed when the nuclear reactor control blade 10 is used. From this curve, it will be seen that the amount of neutron exposure is drastically increased in a limited region of a certain height (usually about 30 cm) from the upper end extremity of the control blade 10. In other portions of the control blade 10, the amount of neutron exposure is progressively decreased towards the lower end of the control blade 10.

The control blade 10 in accordance with the present invention is so designed as to provide a satisfactory control effect under the neutron multiplication factor characteristics and the amount of neutron exposure characteristics shown in FIGS. 15 and 16. Namely, the control blade 10 of the embodiment is so designed that the upper end portion thereof, corresponding to ¼.L (about 90 to 95 cm) is designed to cope with the local reduction in shut-down margin attributable to the rise in the neutron multiplication factor, as well as decreasing tendency of the shut-down margin due to drastic increase in the amount of neutron exposure, which is observed in the upper portion of the reactor core as shown in FIGS. 16 and 17.

As shown in FIG. 3, the neutron absorber elements are designed such that the neutron absorber as a whole is progressively thinned from the end adjacent to the upper structure 12 towards the end adjacent to the lower structure 13, thus decreasing the neutron absorption effect in a corresponding manner. It is to be noted, however, the neutron absorption power in the region of ¼.L from the lower end of the control blade 10, i.e., from the upper end of the lower structure 13, is determined to be slightly smaller than that in the region between ¼.L and 2/4.L, because in the region of ¼.L, the neutron multiplication factor is greater than the region between ¼.L and 2/4.L as shown in FIG. 16, though the amount of neutron exposure in the region of ¼.L is smaller than that in the region between ¼.L and 2/4.L.

Figure 18:
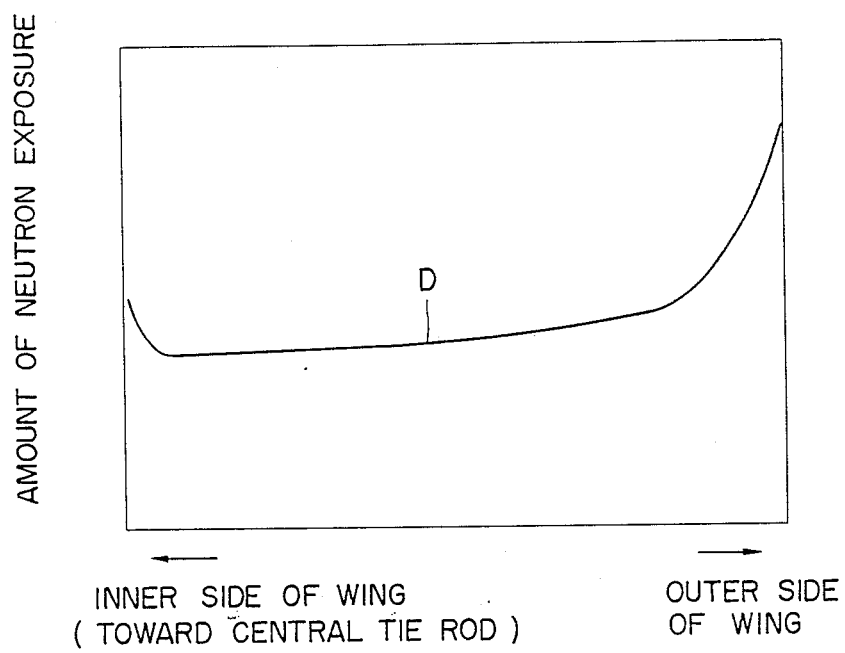
FIG. 18 is a graph showing neutron exposure distribution in the widthwise direction of wing.
Figure 19:
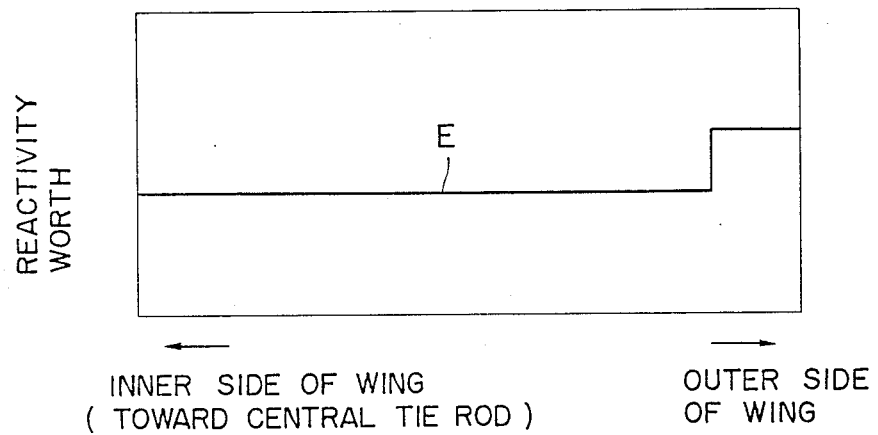
FIG. 19 is a graph showing reactivity worth distribution in the widthwise direction of wing from the central tie rod to radial end of the wing.

FIG. 18 shows a curve D which represents a typical example of the amount of neutron exposure in the breadthwise direction of each wing 16. As will be seen from the curve D, the amount of neutron exposure is drastically increased in the region near the outer end of the wing and is slightly increased in the inner region adjacent to the tie rod 14. It is, therefore, possible to obtain a reactivity worth distribution as shown in FIG. 19, by varying the neutron absorption characteristics of the neutron absorber 18 in the breadthwise direction of the wing 16.

In the nuclear reactor control blade 10 of the described embodiment, the above-mentioned variation in the neutron absorption characteristics can be attained by employing thin neutron absorber plates in each of the elements 18a to 18d (FIG. 2) or 18a to 18h (FIG. 5) of the long-life neutron absorber 18 and arranging these neutron absorber plates such that a flat water gap serving as a passage for the moderator is defined between the opposing neutron absorber plates. It is thus possible to reduce the weight of the long-life neutron absorber 18 in the wing 16 as compared with the case where no water gap is formed within the heavy long-life neutron absorber. This in turn contributes to a reduction in the overall weight of the nuclear reactor control blade 10 as a whole, thus enabling existing control rod drive mechanism to serve without any change or modification in design.

Other embodiments of the nuclear reactor control blade of the present invention will be described hereinunder.

Figure 20:
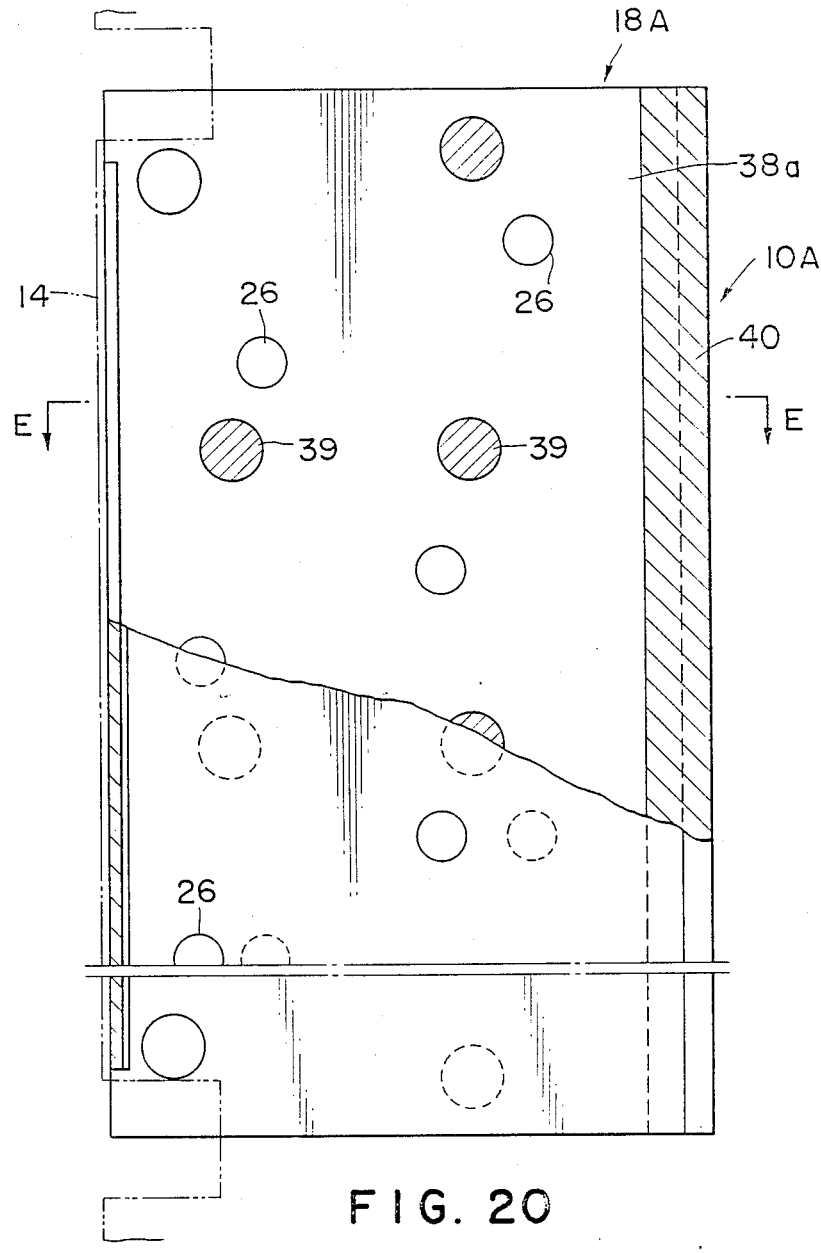
FIG. 20 is a fragmentary view of a second embodiment of the nuclear reactor control blade in accordance with the present invention, showing particularly a long-life neutron absorber.
Figure 21:
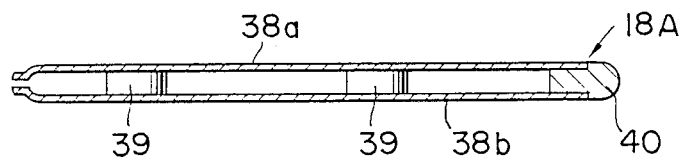
FIG. 21 is a sectional plan view taken along the line E—E of FIG. 20.

FIGS. 20 to 22 show a second embodiment of the nuclear reactor control blade in accordance with the invention, with means for reinforcement of the wings of the control blade.

The control blade denoted by 10A has a plurality of wings each having a plate-like long-life neutron absorber 18A composed of pairs of opposing neutron absorber plates or sheets 38a and 38b which are spaced from and held on each other by means of spot-like spacers 39. These neutron absorber plates are fixed at their end portions corresponding to the outer end of the wing to a common tie rod 40, thus assuring high mechanical strength or stability.

In general, the outer end portions of the neutron absorber plates 38a, 38b receive a greater amount of neutron exposure as compared with other portions. The tie rod 40 provided between these end portions of the neutron absorber plates effectively increases the reactivity. The other ends of the neutron absorber plates 38a and 38b, i.e., the ends adjacent to the central tie rod 14, are curved to approach each other but are spaced from each other so as to absorb any thermal expansion of the neutron absorber plates 38a and 38b.

Other portions of this embodiment are materially the same as those of the embodiment shown in FIGS. 2 and 4 and, therefore, are denoted by the same reference numerals and a detailed description thereof is omitted.

FIG. 23 illustrates a third embodiment of the nuclear reactor control blade in accordance with the present invention. The control blade, generally designated by a numeral 10B, has a plurality of wings each of which is composed of a sheath 15 and a neutron absorber 18B in the sheath. The neutron absorber 18B has pairs of neutron absorber plates or sheets 41a and 41b, each of which is formed by bending a hafnium plate into a deep U-shaped form. These neutron absorber plates 41a and 41b received in the sheath 15 such that their open ends oppose each other across a stiffener 42 which also serves as a spacer. The space between both walls of each U-bent neutron absorber plate constitutes a water gap 25 which serves as a passage for allowing a moderator to flow therethrough. The water gap 25 is preserved by steps formed on the stiffener 42 on which the adjacent ends of both walls of the neutron absorber plate 41 rest, or by a corrugated sheet 43 which is preferably made of a long-life neutron absorbing material such as hafnium. Preferably, the corrugated sheet 43 made of the long-life neutron absorber is positioned in the radially outer portion of the wing 16.

FIG. 24 shows a fourth embodiment of the nuclear reactor control blade in accordance with the present invention.

In this embodiment, the control blade denoted by a numeral 10C has a long-life neutron absorber 18C received in the sheath 15 of each wing 16 and composed of a plurality of neutron absorber plates 46 each of which is composed of a long-life neutron absorber plate which is bent into a deep U-shaped form. The opposing walls of this neutron absorber plate 46 define therebetween a water gap 25 for guiding the flow of a moderator therethrough. More specifically, the neutron absorber plate 46 is made from a hafnium plate and both walls thereof is convexed inward at a substantially mid portion along the breadth of the wing 16. The inward convexities 46a, 46b serve to preserve the water gap 25 and affords any exposure growth of the neutron absorber when exposed to neutrons. The ends of both walls of the neutron absorber plate 46 on the open end of the latter are tapered such that the distance between both walls is gradually increased towards the central tie rod 14 so as to engage tapered surfaces on the end of corresponding projection of the central tie rod 14.

FIG. 25 shows a fifth embodiment of the nuclear reactor control blade in accordance with the present invention. In this embodiment of the control blade denoted by a numeral 10D, the sheath 15 of each blade 16 receives a stiffener 47, and long-life neutron absorber 18D on each side of the stiffener 47. Each neutron absorber 18D is composed of a pair of neutron absorber plates or sheets 48a and 48b arranged to oppose each other and bent inwardly at both ends so as to form therebetween a water gap 25 for a moderator. The bends of the neutron absorber plates are done at the portions where the amount of neutron exposure is high, so that the effective thickness of the neutron absorber and, hence, the reactivity worth (neutron absorption characteristics) is effectively enhanced at these portions. The length over which the neutron absorber plate 48b in the radially outer portion is bent is preferably 1 cm to 3 cm.

Figure 26:
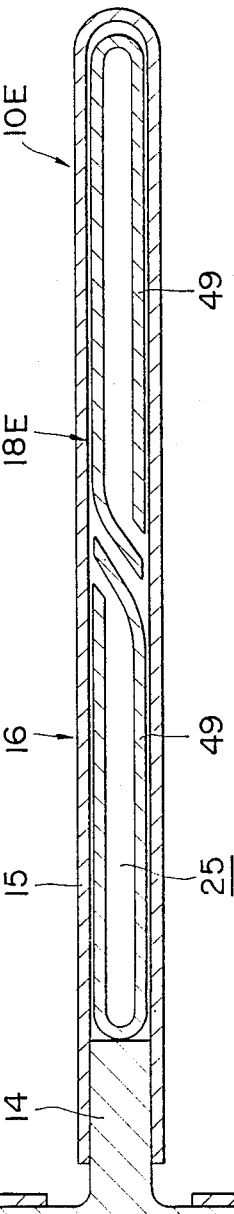

FIG. 26 shows a sixth embodiment of the nuclear reactor control blade in accordance with the present invention. This embodiment of the control blade, denoted by a numeral 10E, has in the sheath 15 of each wing 16 thereof a long-life neutron absorber composed of a pair of plate-shaped neutron absorber plates or sheets 49, 49 each being bent into a deep U-like form. These neutron absorber plates 49 and 49 are disposed in the sheath 15 such that their open ends oppose each other. One of the walls of each plate 49 is extended beyond and bent over the other wall at the open end of the plate 49, thus preserving a water gap 25 between two walls of the plate 49, while affording a margin for the exposure growth when exposed to neutrons.

Figure 27:
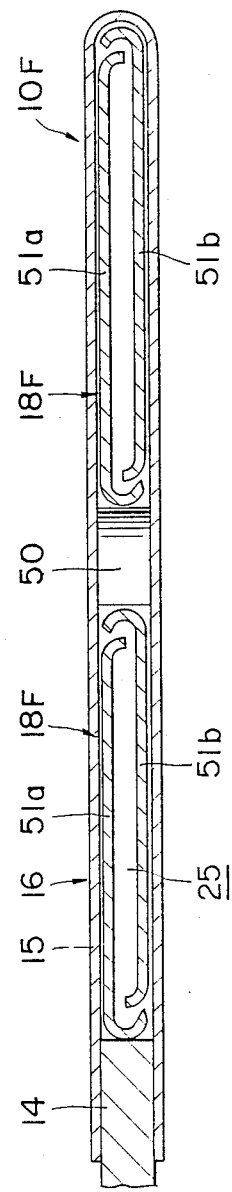

FIG. 27 shows a seventh embodiment of the nuclear reactor control blade in accordance with the present invention. The control blade, denoted by a numeral 10F, has a stiffener 50 disposed in the sheath 15 of each wing 16 thereof, and long-life neutron absorber 18 arranged on each side of the stiffener 50. Each of the neutron absorber 18F is composed of a pair of opposing neutron absorber plates 51a and 51b such that a water gap 25 is defined therebetween.

Each of the neutron absorber plates 51a, 51b is lightly bent at one of its ends and bent largely at the other of its ends, and is arranged so that the largely bent end of each plate embraces the lightly-bent end of the other plate. The bends of both neutron absorber plates 51a, 51b serve to preserve the water gap 25 between these plates while affording a margin for the growth of the neutron absorber plates when exposed to neutrons.

In the second to the seventh embodiments described hereinbefore, the neutron absorber is divided in the direction of axis of the central tie rod into a plurality of neutron absorber elements each of which is arranged such that a water gap 25 for guiding the flow of a moderator is defined between opposing walls or opposing plates of the neutron absorber material. In consequence, the weight of the neutron absorber is reduced by an amount corresponding to the volume of the water gap, so that the weight of the control blade as a whole is effectively and securely reduced to enable the control blade to be handled by the existing control rod drive mechanism without requiring any change or modification of the control rod drive mechanism.

Since the moderator is allowed to flow through the water gap defined between the neutron absorbers, the reactivity is enhanced to allow a reduction in the amount of the neutron absorber. Furthermore, the neutron absorber elements can be positioned effectively at portions where the provision of the neutron absorber is significant from the view point of the reactor shut-down margin. It is thus possible to effectively increase the reactivity while improving also the shut-down margin of the reactor.

FIGS. 28 to 31 show eighth to eleventh embodiments of the nuclear reactor control blade in accordance with the present invention.

Figure 28:
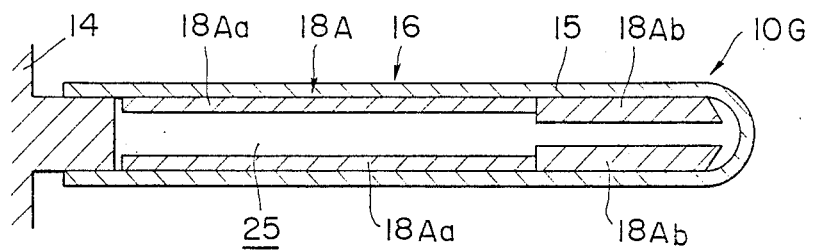

The embodiment shown in FIG. 28, denoted by a numeral 10G, has a neutron absorber 18 in each wing thereof. The neutron absorber 18 constituted by, for example, hafnium metal plates, is divided into a plurality of elements in the axial direction, one of which is shown and indicated at 18A. In this embodiment, the neutron absorber element represented by 18A is divided into two sections: namely, an inner section composed of opposing neutron absorber plates 18Aa, 18Aa and an outer section composed of opposing neutron absorber plates 18Ab, 18Ab, in the breadthwise direction of the wing 16, i.e., in the radial direction of the control blade. The neutron absorber plates 18Aa and 18Aa, as well as the neutron absorber plates 18Ab and 16Ab, are disposed to oppose each other in the thicknesswise direction of the wing 16, thereby defining therebetween a water gap 25 for guiding the flow of a moderator. It will be seen that the width of the water gap 25 is changed in a stepped matter in the breadthwise direction of the wing 16, because the neutron absorber plates 18Aa of the inner section has a smaller thickness than the neutron absorber plates 18Ab in the outer section.

Figure 29:
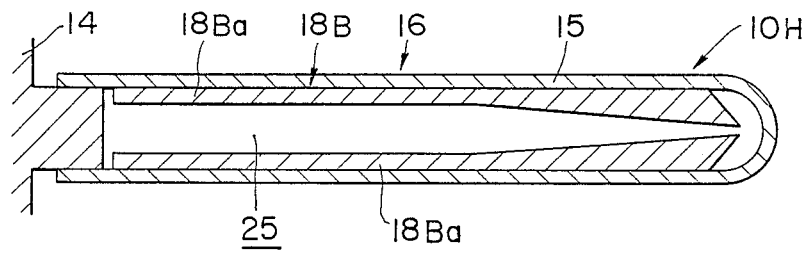

In the embodiment shown in FIG. 29, the control blade denoted by 10H has in each wing thereof a plurality of neutron absorber elements 18B composed of a pair of opposing neutron absorber plates or sheets 18Ba the thickness of which is progressively decreased from the radial end of the wing 16 towards the central tie rod 14.

Figure 30:
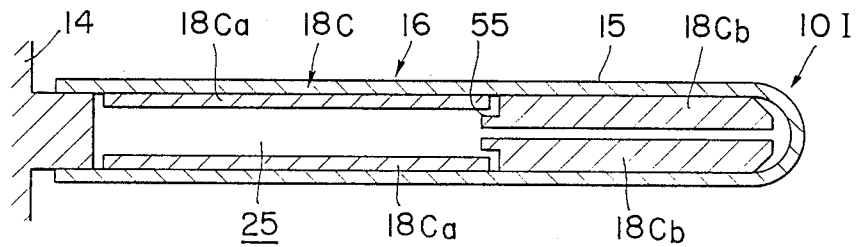

In the embodiment shown in FIG. 30, the control blade denoted by 10I has in each wing thereof a neutron absorber 18 divided in the axial direction into a plurality of elements 18C which is further divided in the breadthwise direction into an inner section composed of neutron absorber elements 18Ca, 18Ca and an outer section composed of neutron absorber elements 18Cb, 18Cb. In order to avoid any gap formed between the inner and outer sections, engaging steps 55 are formed on the ends of the neutron absorber plates or sheets 18Cb, 18Cb adjacent to the inner section, so that the ends of the neutron absorber plates or sheets 18Ca, 18Ca of the inner section fit the engaging steps 55. Such engaging steps may be formed both on the neutron absorber plates of both the inner and outer sections. With this arrangement, since the neutron absorber plates 18Ca, 18Ca of the inner section and the neutron absorber plates 18Cb, 18Cb of the outer section are partially overlapped, it is possible to prevent any leak of neutrons from the boundary between both sections.

Figure 31:
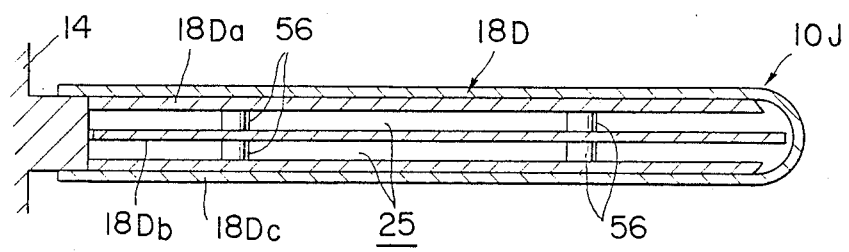

In the embodiment shown in FIG. 31, the control blade denoted by 10J has a neutron absorber element 18D in each wing 16 thereof. The neutron absorber element 18D is composed of three neutron absorber plates or sheets 18Da, 18Db and 18Dc which are arranged in the thicknesswise direction of the wing 16. These neutron absorber plates 18Da, 18Db and 18Dc are held together by means of spacers 56 so as to form water gaps 25 between the adjacent neutron absorber plates.

Figure 32:
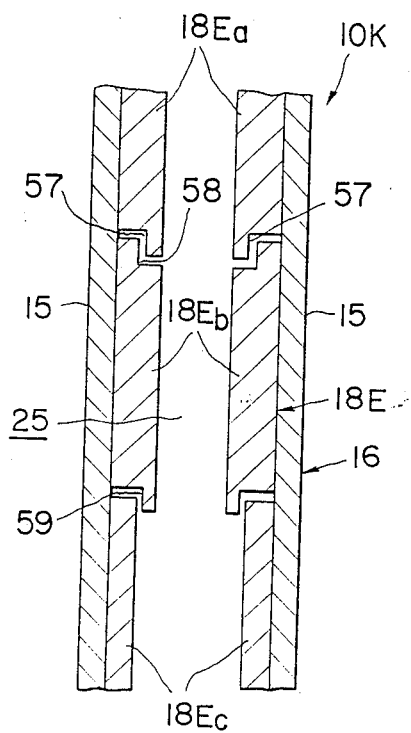
FIG. 32 is an illustration of a modification of the wing in the control blade in accordance with the present invention.

FIG. 32 shows a twelfth embodiment of the nuclear reactor control blade in accordance with the present invention. The control blade of this embodiment, denoted by a numeral 10K, has a neutron absorber 18E in each wing 16 thereof. The neutron absorber 18E is divided in the axial direction into a plurality of elements 18Ea, 18Eb, 18Ec and so forth, each of which is composed of opposing neutron absorber plates or sheets. In this embodiment, the neutron absorber plates of the adjacent elements are partially overlapped at their adjacent ends by steps formed on both or either one of these elements. For instance, the neutron absorber plates of the uppermost neutron absorber element 18E*a* are provided at their ends adjacent to the next element 18E*b* with steps 57, which mate steps 58 formed in the adjacent ends of the neutron absorber plates of the element 18E*b*. The neutron absorber plates of the neutron absorber element 18E*b* are provided on their other ends with steps 59 so as to overlay the adjacent ends of the neutron absorber plates or sheets of the next element 18E*c*. In the element 18E*c*, no step is formed in the ends of the neutron absorber plates adjacent to the element 18E*b* because the thickness of the neutron absorber plates or sheets in the element 18E*c* is smaller than that in the element 18E*b*. The shapes and the arrangements of the steps illustrated in FIG. 32 are only illustrative and may be modified in various forms.

A description will be made herein under as to an embodiment of the nuclear reactor control blade of the invention which employs an anti-crevice measure for the purpose of preventing any electrochemical corrosion.

Figure 33:
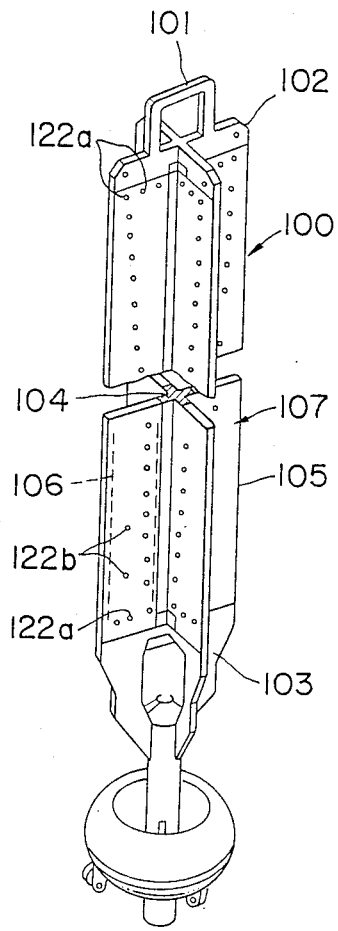
FIG. 33 is an overall perspective view schematically illustrating a nuclear reactor control blade in accordance with the present invention, employing an anti-crevice measure.
Figure 34:
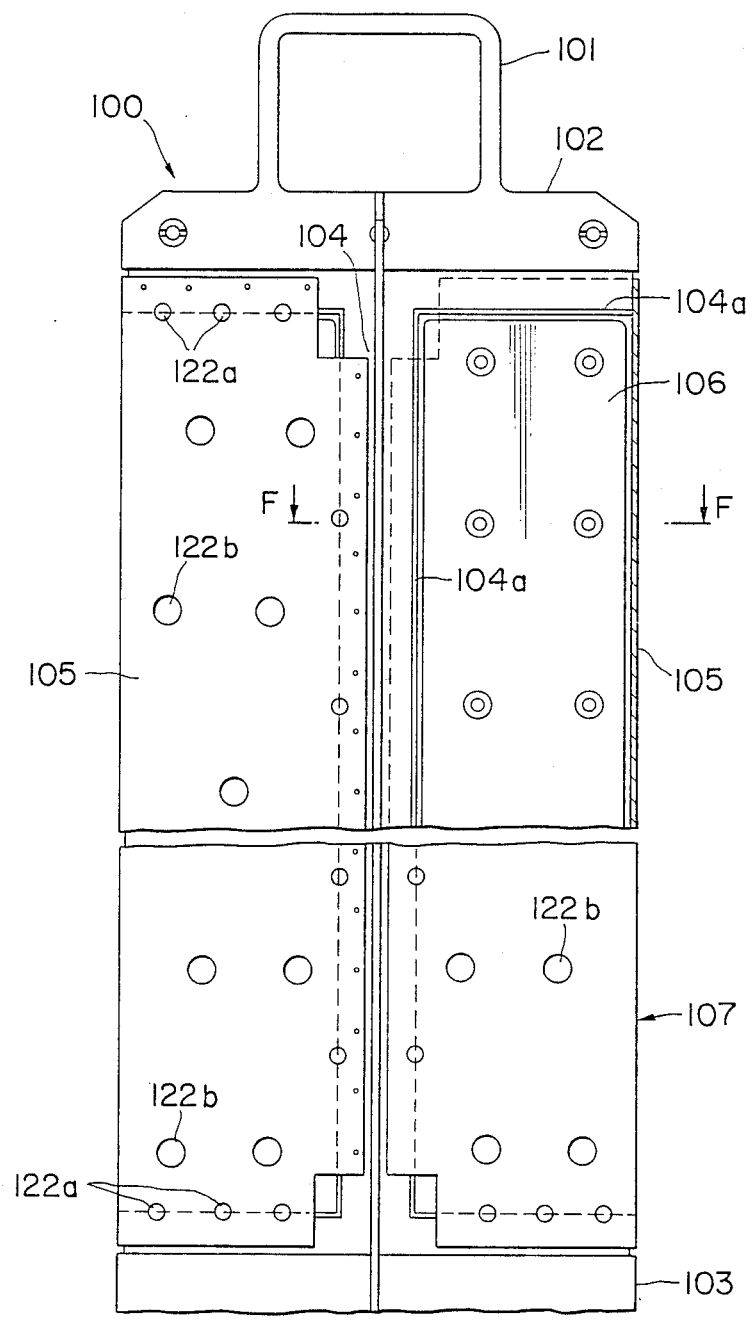
FIG. 34 is a partly-sectioned front elevational view of the control blade in accordance with the present invention.

FIGS. 33 is a perspective view of the control blade employing anti-crevice measure, while FIG. 34 is a side elevational view of the control blade in which the right-side wing is partly-sectioned.

The control blade, which is generally denoted by a numeral 100, has an upper structure 102 provided with a handle 101, a lower structure 103 and a central tie rod 104 having a cross-shaped cross-section and integrally interconnecting the upper structure 102 and the lower structure 103. A sheath 105 having a U-shaped cross-section is secured to each projection on the central tie rod 102. Each sheath accommodates a plate-like long-life neutron absorber 106 which is typically made of hafnium plate. The sheath 105 and the long-life neutron absorber housed therein constitutes a wing 107. Thus, the control blade 100 has four wings 107.

As will be seen from FIG. 35, the neutron absorber 106 includes neutron absorber plates 106*a* in the form of rectangular sheets and arranged to oppose each other in the thicknesswise direction of the wing 107. These opposing neutron absorber plates 106*a*, 106*a* are spaced from each other by supporting spacers 108 such that a water gap 110 for guiding the flow of moderator is defined therebetween.

Washer-like spacers 109 are mounted on both sides of each supporting spacer 108 so that a water passage 111 of a predetermined width is formed between the outer surface of each neutron absorber plate 106*a* and the adjacent inner wall of the sheath 105.

At the same time, a water passage spaces 112*a* are formed between the side surfaces of the neutron absorber plates 106*a* adjacent to the central tie rod 104 and the opposing surface of the central tie rod 104. These water passage spaces 102*a* are formed by, for example, chaffering edges of the projection of the tie rod 104, as at 104*a*. The cross-sectional areas of the water passage spaces 102*a* and, hence, the cooling effect will be increased by chamfering also the edges of the neutron absorber plates 106*a*, as at 113.

Side surfaces of the upper structure 102 and the end structure 103 also are chamferred as at 104*a*, so that water passage spaces 112*a* are formed between these chamferred surfaces and the opposing side surfaces of the neutron absorber plates 106*a*.

Preferably, water passage spaces 112*b* are formed also between the inner surface of the sheath 105 and the neutron absorber plates 106*a* at the outer end portion of the wing 107. Such water passage spaces 112*b* can be formed by chamferring the portions of the neutron absorber plates 106*a* as at 113*b*, in the end portion of the wing 107.

The arrangement may also be such that the chamfer 113*b* is provided over the entire circumference of each neutron absorber plate 106*a* so that the water passage spaces 112*a* are formed between the chamferred circumferential edge of the neutron absorber plate 106*a* and the opposing surfaces of the central tie rod 104, upper structure 102 and the end structure 103.

The construction for securing the neutron absorber plate 106*a* will be explained in detail with reference to FIGS. 36 and 37. As explained before, two neutron absorber plates 106*a*, 106*a* are disposed in each sheath 105 so as to oppose each other and are spaced by a predetermined distance from each other by means of the supporting spacers 108. Each supporting spacer 108 has a spacing portion 117 engaging with the opposing neutron absorber plates 106*a*, 106*a* so as to preserve the predetermined gap therebetween and supporting legs 118 projecting from centers of both ends of the spacing portion 117. Both end surfaces of the spacing portion 117 are provided with water passage groove 119, as will be best seen from FIG. 37A. The supporting legs 118 are secured in mounting holes formed in the walls of the U-shaped sheath 105 by welding. However, since the spacer 108 and the sheath 105 are made of the same stainless steel, and since a surface finishing treatment is conducted after the welding, no weld line appears on the outer side of the sheath 105. Washer-like spacers 109 are provided on the supporting legs 118 of the supporting spacer engaging with both neutron absorber plates 106*a*, 106*a*. Namely, the supporting legs 118 of the supporting spacer 108 loosely penetrate holes 120 formed in the neutron absorber plates 120 and fit in the above-mentioned mounting holes 121 formed in the walls of the sheath 105. The supporting legs 118 are then welded to the sheath from the external surface of the sheath 105.

The spacing portion 117 of the supporting spacer 108 serve to preserve a water gap 110 between opposing neutron absorber plates 106*a*, 106*a*, while the washer-like spacers 109 serve to preserve water passages 111 of a predetermined width between the outer surfaces of both neutron absorber plates 106*a* and the adjacent inner surfaces of the sheath 105. Preferably, the surfaces of the washer-like spacers 109 are provided with water passage grooves 119*a*, as in the case of the supporting spacers 108.

The operation and advantage of this embodiment will be described hereinunder. The reactor water serving as the moderator is introduced into each sheath past passage holes 122*a*, 122*b* formed in the walls of the sheath as shown in FIG. 34. The water then flows through the water gap 110 and the water passages 111, while carrying away the heat generated in the neutron absorber plates 106*a*, 106*a*. The reactor water is sufficiently distributed also to the water passage spaces 112*a* formed between the neutron absorber plates 106*a* and the adjacent constituents of the control blade, as well as to the water passage spaces 112*b* formed between the neutron absorber plates 106*a*, 106*a* and the inner surface of the sheath 105 at the outer end portion of each wing 107. In consequence, there is no stagnation of water or dead water space. Thus, a smooth flow of the water is ensured over the entire region in the control blade so that any local heating of the neutron absorber plates 106a, 106a and the sheath 105 is avoided. The supporting spacers 108 are provided with water passage grooves 119 formed therein so that the reactor water is allowed to flow along the surfaces of the supporting spacers 108 contacting the neutron absorber plates 106a, 106a, so that overheating of the spacers 108 is prevented.

In this embodiment, therefore, cooling effect of the reactor water is ensured by virtue of the water passages 111 formed between the outer surfaces of the neutron absorber plates 106a, 106a and the adjacent inner walls of the sheath 105 and water passage spaces 112a and so forth formed along the side surfaces of the neutron absorber plates 106a, 106a, in addition to the provision of the water gap 110 formed between both neutron absorber plates 106a and 106a. This effectively eliminates any risk that the sheath 105 and the neutron absorber plates 106a, 106a may be damaged by local overheating.

It is also to be noted that the constituents such as the sheath 105, neutron absorber plates 106a, 106a and the central tie rod 104 are spaced from each other by the water gap 110, water passages 111 and the water passage spaces 112a. Therefore, the risk that these constituents may be electrochemically corroded due to direct contact of different metallic materials can be avoid almost completely, so that the nuclear reactor control blade can operate for a long period in sound state.

Figure 38:
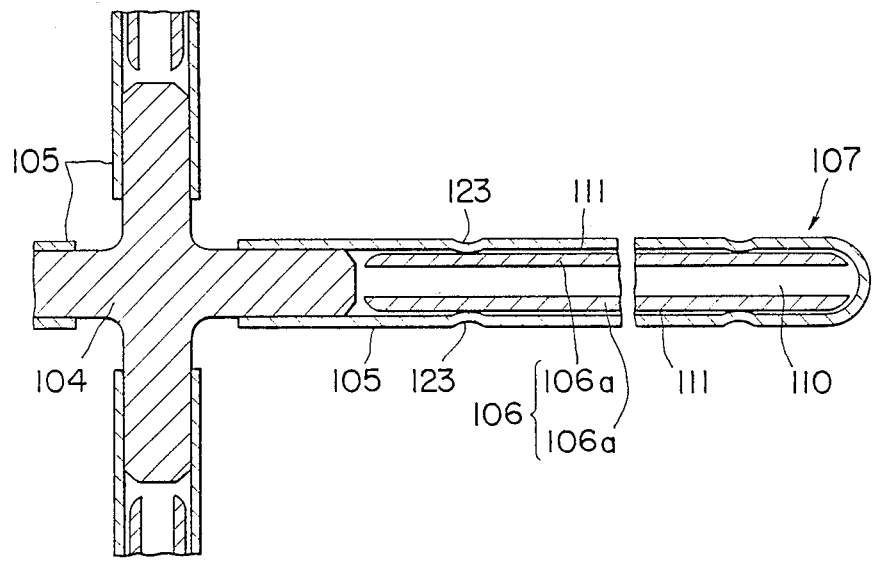
FIG. 38 is an overall perspective view schematically illustrating a different embodiment of the nuclear reactor control blade in accordance with the present invention, employing an anti-crevice measure.

A nuclear reactor control blade employing another example of anti-crevice measure will be described hereinunder with reference to FIG. 38.

In this embodiment, a multiplicity of dimples 123 are formed in the wall of the sheath 105 such that the reverse side of these dimples project inwardly of the sheath 105. The ends of the projections provided by the dimples contact the adjacent surface of the neutron absorber plate 106a so as to keep this surface of the neutron absorber plate 106a from the inner surface of the sheath 105, thereby forming water passage 111 of a predetermined width therebetween. The same effect is produced by forming the dimples in the neutron absorber plate 106a such that the reverse side of the dimples project towards the outer side into contact with the surface of the sheath. In this embodiment, it is not necessary to employ any specific member for the purpose of regulating the width of the water passages 111, such as the washer-like spacer 109 (see FIG. 35) employed in the preceding embodiment, so that the work for fabricating the spacers, as well as the assembly of the wing 107, can be facilitated advantageously.

The nuclear reactor control blades shown in FIGS. 34 to 38 offer the following advantages.

Namely, these control blades enable the reactor water to flow smoothly without any stagnation and without forming any dead water space, by virtue of the provision of the water passages 111 between the outer surfaces of the neutron absorber plates 106a, 106a and the inner surfaces of the sheath 105, as well as the water passage spaces 112a, 112b formed between the side surfaces of the neutron absorber plates 106a, 106a and the adjacent surfaces of the central tie rod 104, upper structure 102 and the lower structure 102. In consequence, heat exchange is conducted without any impediment in the regions where heat is generated as a result of the neutron absorption, so that any damage of the sheath due to local heating is avoided.

In addition, the water passages 111 serve to keep the outer surfaces of the neutron absorber plates 106a away from the inner surfaces of the sheath 105, while water passage spaces serve to prevent direct contact between the neutron absorber plates and members there around. Therefore, any risk of electrochemical corrosion occurring due to direct contact of different metallic materials is prevented, thus ensuring the nuclear reactor control blade to operate for a long period of time in the sound state.

A description will be made hereinunder as to an embodiment of the nuclear reactor control blade which employs both an anti-crevice measure and an anti-earthquake measure, with reference to FIG. 39 in which the same reference numerals are used to denote the same parts or members as those of the control blade 100 shown in FIGS. 33 to 37.

Figure 39:
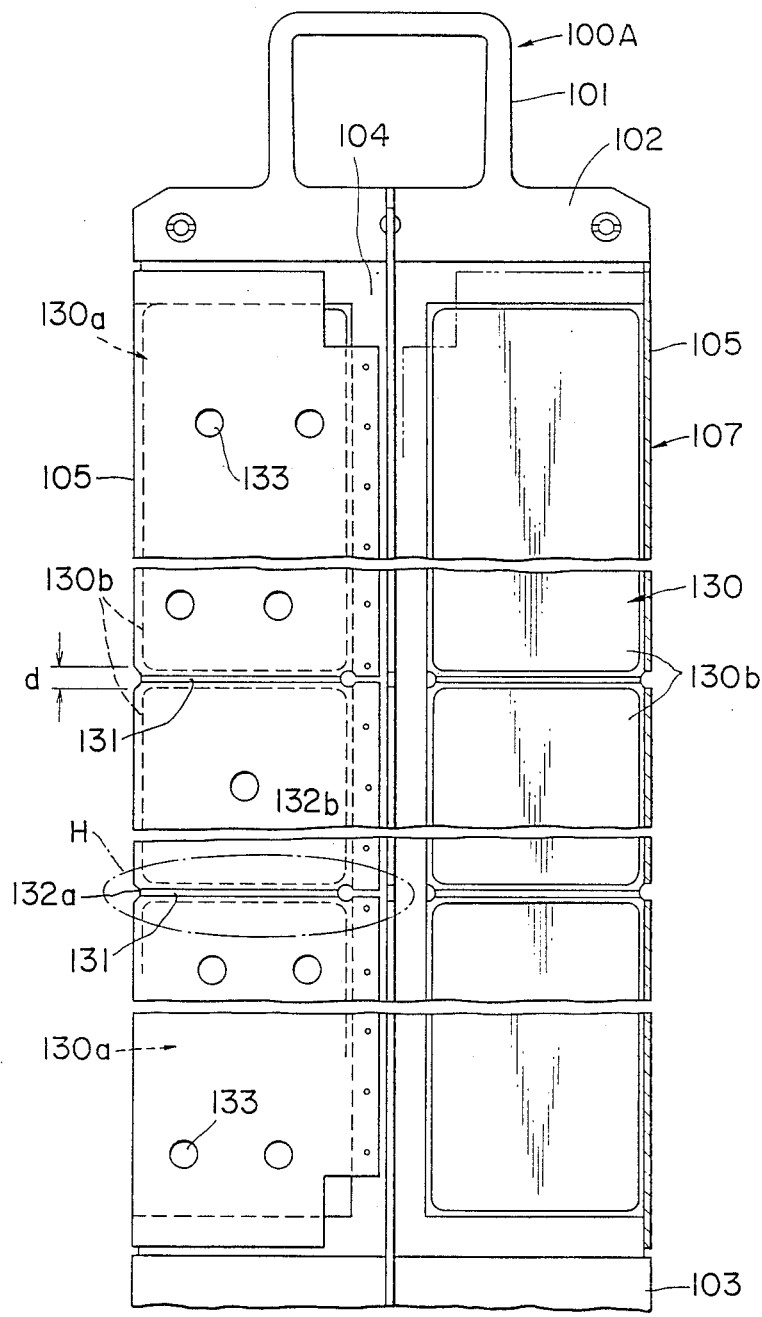
FIG. 39 is a partly-sectioned front elevational view of a nuclear reactor control blade in accordance with the present invention, employing both an anti-crevice measure and an anti-earthquake measure.

General arrangement of the control blade 100A shown in FIG. 39 is similar to that of the control blade 100 explained before. In this control blade 100A, a long-life neutron absorber 130 such as of hafnium sheet accommodated in the sheath 105 is divided into a plurality of stages or neutron absorber elements 130a along the axis of the central tie rod 104. The neutron absorber element 130a of each stage is composed of a plurality of, e.g., two, neutron absorber plates 130b arranged so as to oppose to each other and integrally connected through a plurality of spacers 108. A water gap 110 for allowing a moderator to flow therethrough is defined between the opposing neutron absorber plates 130b. Recesses 131 are formed in the walls of the sheath 105 of each wing 107 so as to extend in a direction perpendicular to the axis of the sheath 105. As will be seen from FIGS. 39 and 40, each of the recesses 131 is formed by depressing inwardly the wall of the sheath 105 along a line extending in the breadthwise direction of the wing 107, so that the inner surface of the sheath wall project into a gap d formed between the neutron absorber plates 130b of the adjacent neutron absorber elements 130a.

It is assumed here that each wing 107 is divided in the axial direction into three regions: namely, an uppermost first region, an intermediate second region and a lowermost third region. The recesses 131 are provided such that at least one recess 131 is formed at the upper end of the second region so as to extend in a direction perpendicular to the axis, i.e., in the breadthwise direction of the wing. Each recess 131 is so formed that it provides a communication between a notch 132a formed in the outer end of each wing 107 and a notch 132b formed in the portion of the sheath where the sheath is connected to the central tie rod.

Figure 40:
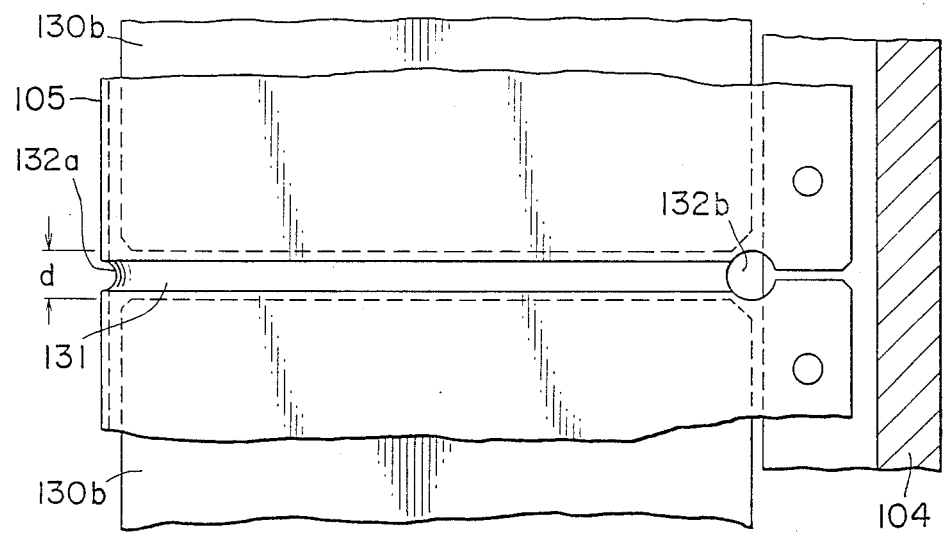
FIG. 40 is an enlarged front elevational view of the portion marked at H in FIG. 39.
Figure 41:
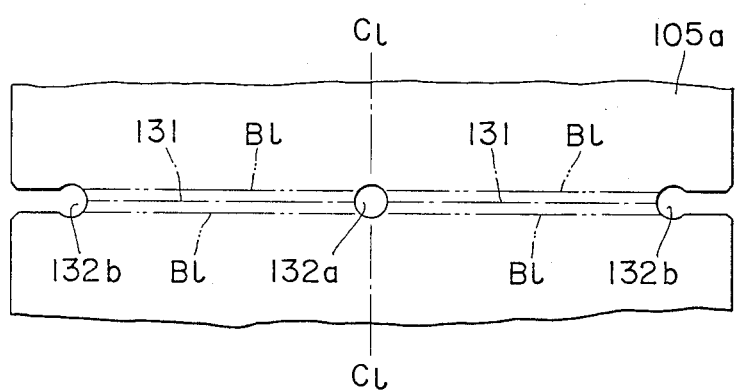
FIG. 41 is a developed view of a sheath, explanatory of a process for producing the sheath.

FIG. 41 illustrates a process for fabricating the sheath 105 having the recesses 131. A blank sheet 105a of the sheath steel in the developed state is notched at its both side edges as at 132a and an aperture 132b is formed as illustrated. Then, a suitable mechanical processing is conducted to cause the blank sheet 105a to be bent along bend lines B1—B1 which interconnect the notches 132a and the aperture 132b, whereby the recess 131 is formed. The bending operation is facilitated by virtue of the presence of the notches 132b, 132b on both sides edges of the blank sheet 105a and the central aperture 132a. Then, the blank sheet 105a is bent along a vertical line C1 which passes the aperture 132a into a form like U, whereby a deeply-bent U-shaped sheath 105 is formed. The thus formed U-shaped sheath 105 with the recesses 131 is fixed to the corresponding projection of the central tie rod 104 by, for example, spot welding, as shown in FIG. 40. In this state, the recess 131 is so positioned that the reverse side of the neutron absorber plate corresponding to the recess projects into a gap d formed between the adjacent neutron absorber plates 130b, 130b of the adjacent neutron absorber elements 130a. In order to accomplish a smooth flow of the moderator into and out of the sheath 105, a plurality of water passage holes 133 are formed in predetermined portions of the sheath 105 as will be seen from FIG. 39.

In this embodiment, since recesses extending in the direction perpendicular to the axis of each wing are formed in the walls of the sheath such that the inner surfaces of the sheath wall project inwardly, undesirable outward expansion of the sheath is prevented even when an excessively large bending stress on the central blades and/or any excessive stress due to large acceleration in the axial direction is caused in the event of a heavy earthquake. In consequence, smooth movement of the control blades is ensured even in the case of such a heavy earthquake. Namely, when a large external force is applied to the control blades due to, for example, an earthquake, the force transmitted to the sheath 5, tending to deform the sheath, is effectively absorbed by the expansion or contraction of the sheath wall along the linear recesses, so that any outward deformation of the sheath wall is avoided. It will be understood that the outward deformation of the sheath will cause a serious problem in that the movement of the control blade is hindered due to mechanical interference between the sheath of the control blade and the fuel assemblies around the control blade. The prevention of the outward deformation of the sheath, therefore, offers a great advantage from the view point of safety.

As stated before, the advantage of the recess 131 is remarkable particularly when it is provided in the second of three regions defined along the axis of the wing 107. This is because the deformation of the sheath, attributable to the stress in the control blade 100A due to, for example, an earthquake is greatest in the second region, i.e., the axial mid region of the control blade 100A. In this embodiment, therefore, the gap d for receiving the inward projection formed as a result of the recessing of the linear recess 131 is provided by an axial discontinuity of the neutron absorber only in the second region of the wing 107, while the neutron absorber is arranged without discontinuity in the uppermost first region of the wing which receives the heaviest neutron exposure. This in turn ensures a sufficiently large value of the reactor shut down margin. The provision of the linear recess 131 in the lowermost third region of the wing is not so significant because this lowermost region receives only a small external force as compared with the second region. The number and the positions of the linear recesses 131 in the second region can be determined suitably taking into account the factors such as the load condition.

Figure 43:
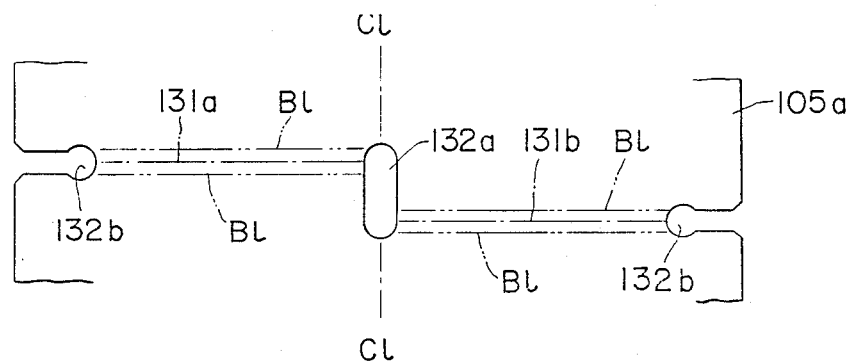
FIG. 43 is a developed view of a sheath explanatory of another process for producing the sheath.

It is also possible to control the rigidity of the blade by designing such that the positions of the linear recesses are varied according to the wings 107. It is also possible to form the linear grooves 131 on both sides of each wing 107 at different heightwise or axial positions, as shown in FIG. 43. The sheath used in such a wing may be formed by the same process as that explained before in connection with FIG. 41, though the aperture 132a which is to provide the notch in the outer end of the wing has a vertically elongated form.

Figure 44:
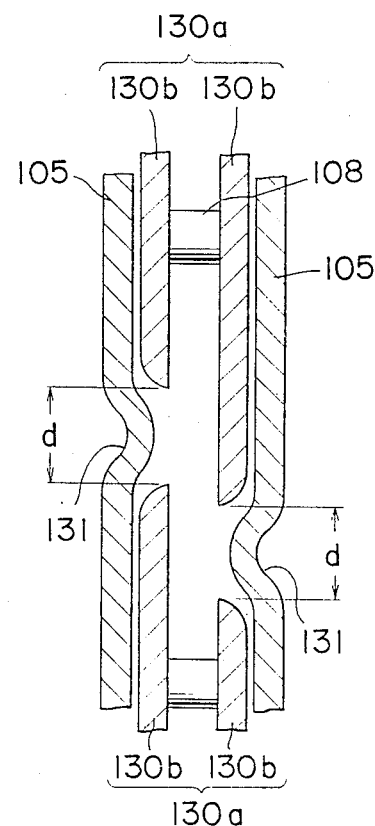
FIG. 44 is a sectional view of a modification of the arrangement shown in FIG. 42 having a different arrangement of recesses.

FIG. 44 is a sectional view of a wing which is obtained by bending the blank sheet 105a shown in FIG. 43 into a deep U-like form so as to form a sheath, and securing the thus formed sheath to the central tie rod with the neutron absorber 130b received therein. In this case, the gaps d, d of about 10 mm, formed between the adjacent neutron absorber plates 130b, 130b at both thicknesswise ends of the wing, are staggered in the heightwise direction from each other such that each gap d is masked by the opposing neutron absorber plate 130a.

Figure 42:
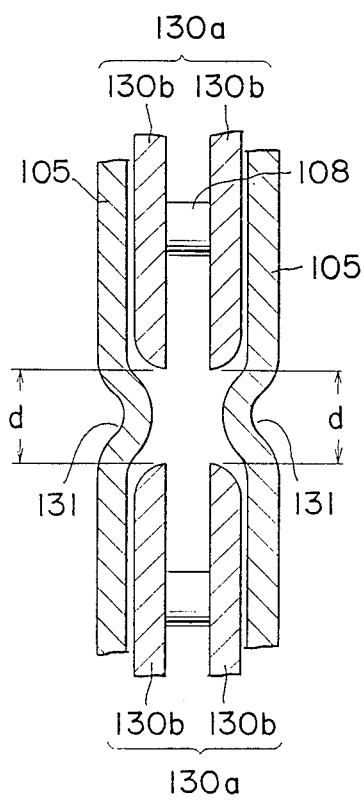
FIG. 42 is a sectional view taken along the line I—I of FIG. 39.

The construction shown in FIG. 44 offers, unlike the arrangement shown in FIG. 42 in which the linear recesses on both sides of the wing are positioned at the same level, an advantage that neutron fluxes passing through each gap d is effectively masked by the opposing neutron absorber plate 130b so that local reduction in the reactivity worth at the position of the gap d is avoided, thus preventing any reduction in the reactor shut-down margin.

Preferably, the corners of the neutron absorber plates 130b facing the projections on the back side of the recesses 131 are chamferred as shown in FIGS. 42 and 44, so that application of local stress to bent portions of the sheath is avoided.

FIGS. 45 to 48 show modifications of the nuclear reactor control blades explained before in connection with FIG. 39. In these Figures, the control blade is generally designated at a numeral 100B nd the same reference numerals are used to denote the same parts or members as those used in the control blade 100A shown in FIG. 39, with the description of such parts or members being omitted.

Figure 45:
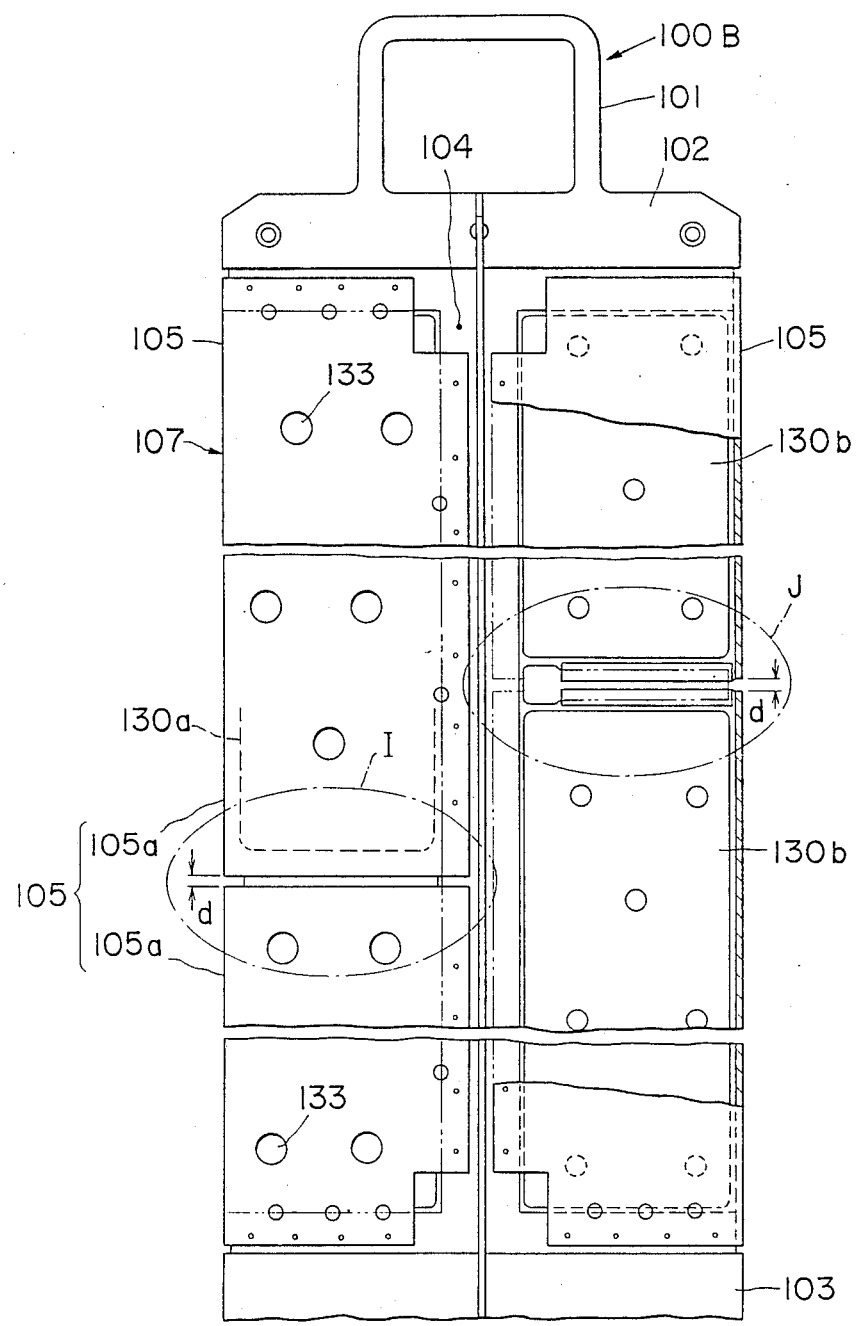
FIG. 45 is a partly-sectioned front elevational view of a modification of the nuclear reactor control rod shown in FIG. 39.

The nuclear reactor control blade 100B has a sheath 105 accommodating a long-life neutron absorber 130 which is divided into a plurality of elements in the axial direction of the central tie rod. The sheath 105 also is divided at portions corresponding to the division of the neutron absorber 130a so that the sheath 105 is composed of a plurality of sheath elements arranged in the direction of axis of the central tie rod 105. The arrangement is such that at least one discontinuity of the sheath, extending in the direction perpendicular to the axis, i.e., the breadthwise direction of the wing 107, is located within the second one of the axial three regions of the wing 107, i.e., the intermediate one of three regions which are assumed along the height of the wing 107. This is because the stress generated in the sheath wall caused by, for example, an earthquake and, hence, an amount of deformation of the sheath wall are greatest in the second region of the sheath. The arrangement may be such that, as shown in FIG. 45, the different wings have different positions of division of the sheath. Such an arrangement offers an advantage that the rigidity or strength of the sheath 105 as a whole is increased because the discontinuities are not concentrated to the same height along the axis of the sheath 105.

Figure 46:
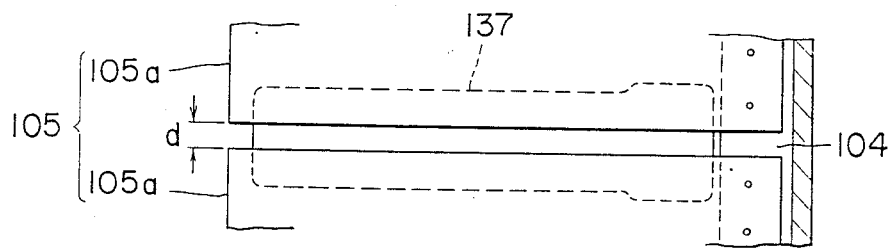
FIG. 46 is a view illustrating the detail of a portion marked at I in FIG. 45.

As will be seen from FIG. 46, a gap d of a predetermined size is formed between the adjacent sheath elements 105a and 105a. The size of the gap d is so determined that any deformation of the control blade due to an external force is sufficiently absorbed by this gap.

Figure 47:
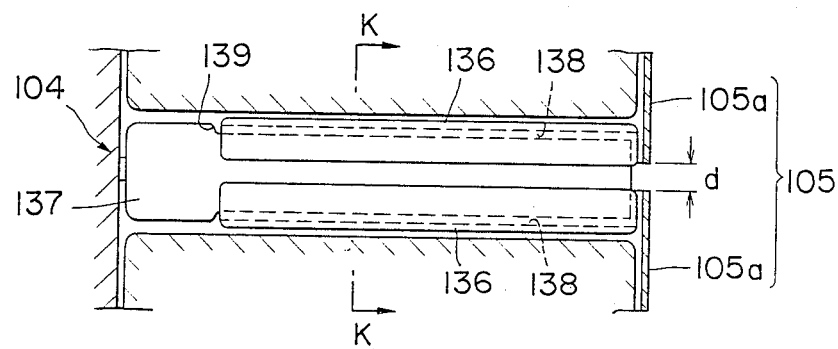
FIG. 47 is a view illustrating the detail of a portion marked at J in FIG. 45.
Figure 48:
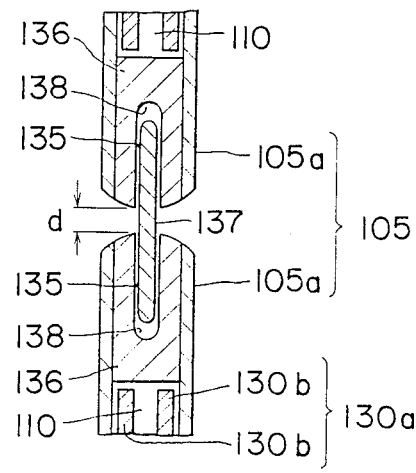
FIG. 48 is a sectional view taken along the line K—K in FIG. 47.

As will be seen from FIGS. 47 and 48, a holding member 136 having a fitting groove 135 extending in the breadthwise direction of the sheath element 105a is fitted in the end of each sheath element 105a. Thus, the fitting grooves 135 in the opposing ends of the adjacent sheath elements oppose each other and slidably receive a tabular neutron absorber constituted by, for example, a hafnium plate, such that the neutron absorber 137 is movable within the grooves 135 in the direction of axis of the control blade. That is, the adjacent sheath elements 105a and 105a are connected through the intermediary of the neutron absorber 137 in a manner capable of expanding and contracting in the axial direction. The overall width of the fitting grooves 135, 135 is greater than the overall width of the neutron absorber 137, and a space for absorbing the axial displacement of the neutron absorber 137 is left behind the neutron absorber, i.e., at the innermost end of each groove 135. The neutron absorber 137 fitting in the grooves 135 may have a substantially T-shaped cross-section as shown in FIG. 47. In such an arrangement, the step 139 of the tabular neutron absorber 137 abuts the end surface of the holding member 136 thereby limiting the movement of the neutron absorber 137 in the breadthwise direction. In consequence, the tabular neutron absorber 137 is prevented from coming off and from contacting the outer end of the sheath. It is also preferred that the end surfaces of the sheath elements 105a and the corners of the holding member 136 are chamferred so as to prevent any damage which may occur due to mechanical interference between the adjacent sheath elements.

In the event that a large bending force is applied to the nuclear reactor control blade due to, for example, a heavy earthquake, the greater stress occurs in the axially mid portion of the control blade having an elongated form, so that the greatest strain or deformation appears in this portion of the control blade. This deformation, however, is effectively absorbed by the gap d formed between the adjacent sheath elements 105a, as well as by the fitting grooves 135. Namely, the tabular neutron absorber 137 is allowed to slide in the axial direction of the control blade by an amount corresponding to the deformation, thus preventing any stress to occur in the sheath wall. This conveniently avoids any outward deformation of the sheath, which may otherwise occur to cause a mechanical interference between the control blade and the adjacent fuel assemblies, seriously impeding the vertical movement of the control blade.

In this embodiment, no discontinuity of the sheath is provided in the heightwise first region corresponding to ⅓ of the entire height of the control blade as measured from the upper end, so that no substantial reduction in the neutron absorbability takes place in this first region. As explained before, the upper end of the control blade and the outer ends of wings of the control blade are generally subjected to the heaviest neutron exposure. It is, therefore, not preferred to provide any discontinuity of the sheath, i.e., discontinuity of neutron absorber, in such portions of the control blade. In this embodiment, since the discontinuity due to the division of the sheath is located in the second region, i.e., in the intermediate one of three regions assumed in the axial or heightwise direction of the control blade, it is possible to avoid any reduction in the neutron absorbability in the first region and a large margin for shutting down the reactor is ensured.

Figure 49:
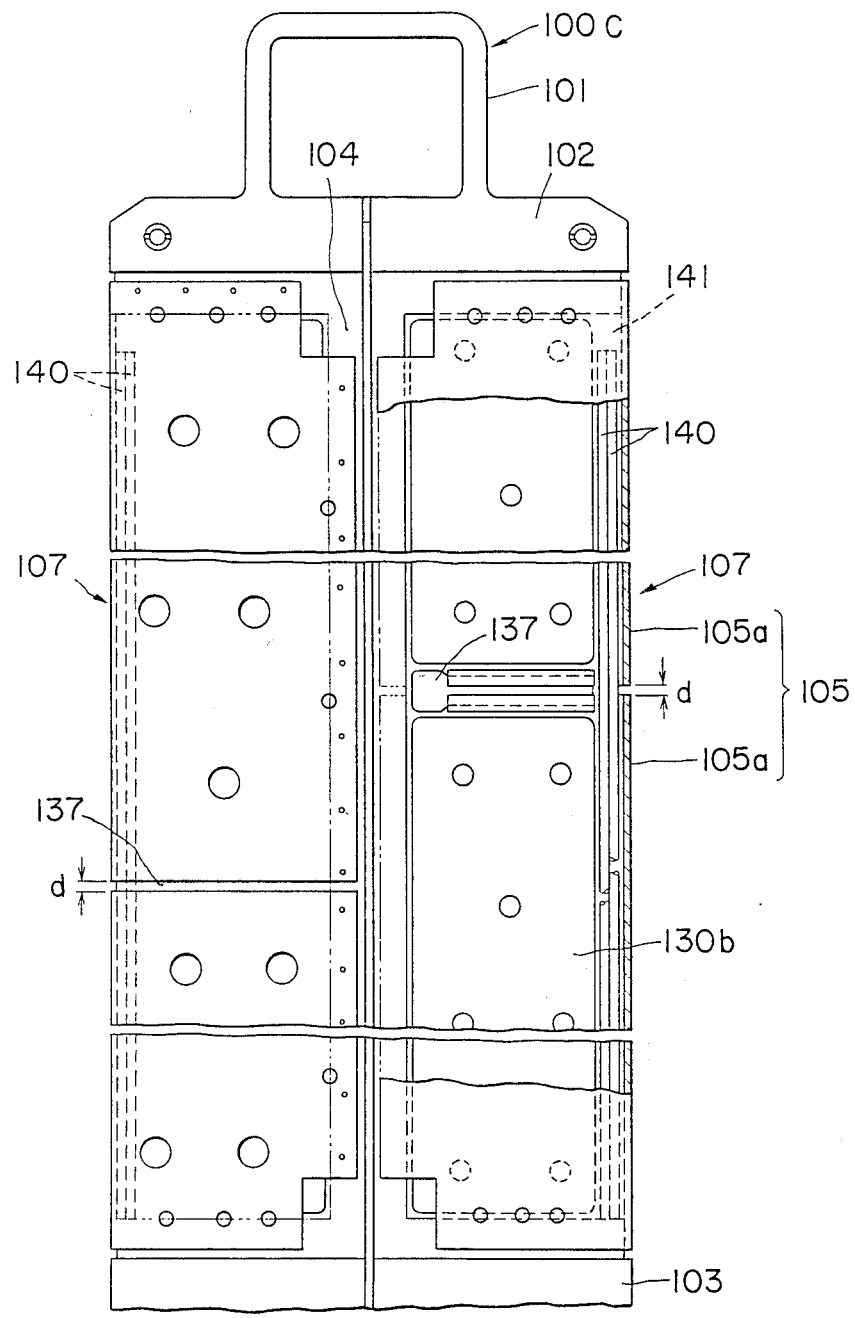
FIG. 49 is a front elevational view of a modification of the control blade shown in FIG. 45.

A description will be made hereinunder as to a modification of the embodiment shown in FIG. 45, with specific reference to FIG. 49. This modification of the control blade, denoted by a numeral 100C, has two elongated hafnium neutron absorber bars 140 of hafnium extending axially of the control blade along the outer edge of each wing 107. A space for accommodating any thermal expansion of the neutron absorber bars 140 are provided at the upper side of these neutron absorber bars 140. Other portions are materially the same as those of the embodiment shown in FIG. 45.

According to this arrangement, the neutron absorbability is increased by the presence of the neutron absorber bars 140 along the outer edge of each wing 107 where the consumption of the neutron absorber is specifically large. In consequence, the nuclear life of the control blade can be prolonged. The neutron absorber bars 140 extending axially along the outer edges of the series of sheath elements 105a effectively serve also as structural members so as to enhance the mechanical strength of each wing.

The neutron absorbability is locally reduced in the regions where there is any discontinuity of the neutron absorber plates 130b. It will be understood that such a local reduction in the absorbability is effectively compensated by the presence of the neutron absorber bars 140. The neutron absorber bars 140 also provide an advantage in that they effectively restrains relative movement between the sheath elements 105a in the same wing 107.

It will be seen that, in this embodiment, the sheath of the control blade is divided into a plurality of sheath elements in the axial direction of the control blade, and the adjacent sheath elements are connected for free expansion and contraction by means of the tabular neutron absorber fitting in grooves formed in the opposing ends of the adjacent sheath elements. In consequence, the deformation of the sheath wall, which may be caused by a large external force applied to the control blade due to, for example, an earthquake is effectively suppressed. Namely, any deformation of the sheath caused by a stress in the control blade can effectively be absorbed by the gaps between the successive sheath elements and the fitting grooves which loosely and slidably receive the interconnecting tabular neutron absorber. This in turn eliminates any risk of the control blade expanding outward and a consequent interference between the control blade and fuel assemblies around the control blade, thus eliminating any impediment to the smooth movement of the control blade. This embodiment, therefore, ensures a smooth movement of the control blade even in the event of application of a large force to the control blade.

A description will be made hereinunder as to different embodiments of the present invention which are hybrid-type control blades incorporating both anti-crevice and anti-earthquake measures.

Figure 50:
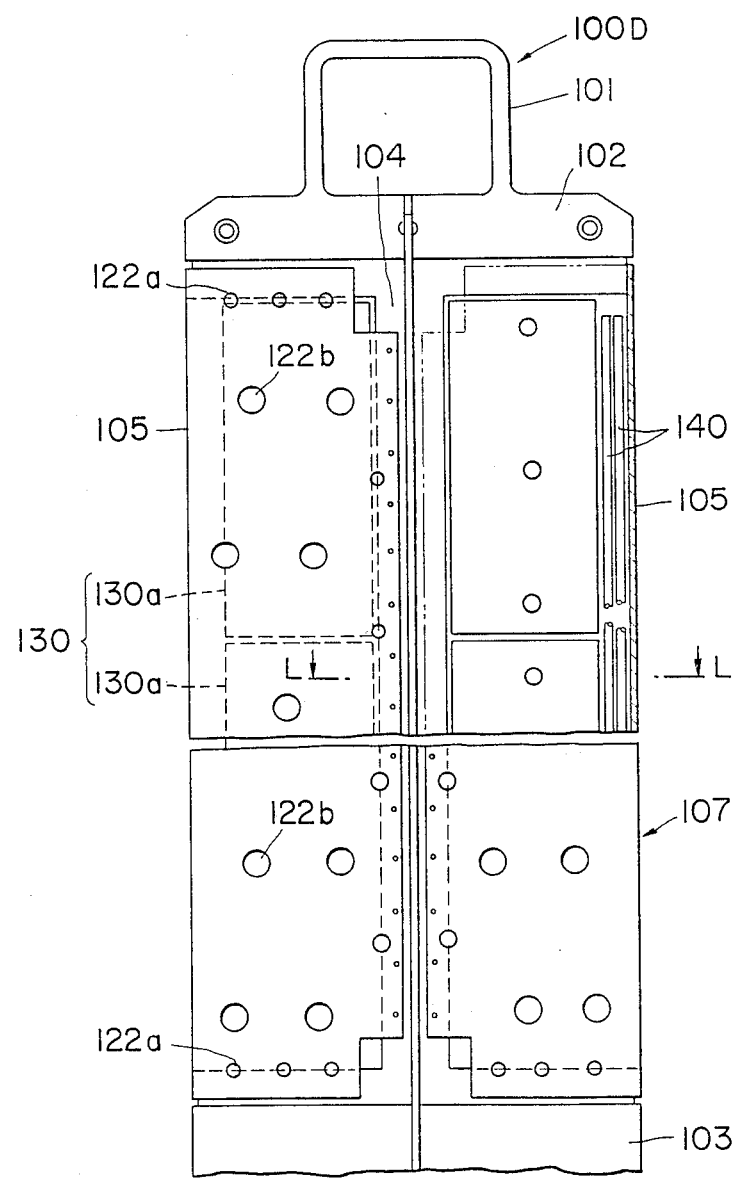
FIG. 50 is a partly-sectioned front elevational view of a hybrid-type nuclear reactor control blade embodying the present invention.

FIG. 50 is a fragmentary front elevational view of a hybrid-type control blade for use in a nuclear reactor, constructed in accordance with the present invention.

This embodiment of the nuclear reactor control blade, generally denoted by a numeral 100D, has an upper structure 102 provided with a handle 101, a lower structure 103 and a central tie rod 104 having a cross-shaped cross-section and integrally interconnecting both structures 102 and 103. A sheath 105 having a U-shaped cross-section is secured to the end of each projection of the central tie rod 104. A plate-like long-life neutron absorber 130, typically made of hafnium, is disposed within each sheath 105 at a portion adjacent to the central tie rod 104. The sheath 105 and the long-life neutron absorber 130 in combination constitute a wing 107. Thus, the control blade is provided with four such wings 7 on the central tie rod 104.

An elongated hafnium bar 140 is disposed adjacent to the neutron absorber 106 so as to extend along the outer edge of the wing 107. The elongated hafnium bar 140 may include 2 to 5 rods of hafnium having circular cross-section and disposed in parallel so as to extend over the entire axial length of the wing along the outer edge of the latter, thus enhancing the strength at the outer end of the wing. In addition, a space for absorbing the thermal expansion of the hafnium bar 140 is formed within the sheath on the upper side of the hafnium bar 140 as shown in from FIG. 50.

On the other hand, the neutron absorber 130 is divided in the axial direction of the tie rod 104 into a plurality of stages or neutron absorber elements 130a. As will be seen from FIG. 51, the neutron absorber element 130a of each stage is constituted by a plurality of neutron absorber plates on sheets 130b arranged such as to oppose in the thicknesswise direction of the wing 107. A water gap 110 for guiding the flow of a moderator is defined between these neutron absorber plates 130b. In addition, water passages 111 are formed between the outer surfaces of the respective neutron absorber plates 130b and the adjacent inner surfaces of the sheath 105. The neutron absorber plates 130b and 130b are held on the sheath 105 at a predetermined distance from each other preserved by end spacers 145 and a central spacer 108. The end spacers 145 and the central spacer 108 are made of hafnium and a stainless steel, respectively.

A detailed description will be made hereinunder as to the construction for securing the neutron absorber plate 130b with specific reference to FIG. 52. The end spacers 145 having a comparatively small axial length are disposed between both neutron absorber plates 130b and 130b at both longitudinal ends of the neutron absorber plates. The neutron absorber plates 130b, 130b are partly fixed to the end spacers 145 by, for example, welding. Each end spacer 145 has a spacing portion 145a the width of which determines the size of the water gap 110 between both neutron absorber plates 130b, 130b. At the same time, water passages 111 of a predetermined width are formed between the outer surfaces of the respective neutron absorber plates 130b, 130b and the adjacent inner surfaces of the sheath 105.

It is preferred that the corners of the projection of the central tie rod 104, as well as the adjacent corners of the end spacer 45 are chamferred as shown in FIG. 52 so as to provide a passage for water so that the reactor water as the moderator encounters a reduced resistance to accomplish a large resistance, whereby the local overheating of the neutron absorber plates 130b is avoided.

The central portions of the neutron absorber plates 130b, 130b are fixed at predetermined positions by means of a central spacer 108 and ring-shaped spacers 109. As will be seen from FIGS. 37A, 37B and 37C, the central spacer 108 has a collar-like seat portion 117 having a thickness corresponding to the width of the channel constituted by the water gap 110. Water passage grooves 118 are formed in both surfaces of the seat portion 117 so that the reactor water as the moderator is allowed to flow along these grooves.

The opposing neutron absorber plates 130b, 130b rest on the respective surfaces of the seat portion 117 of the central spacer 108 and are fixed to the sheath 105 through the intermediary of the respective ring-shaped spacers 109. The central spacer 108 has both axial ends received in mounting holes 146 formed in the walls of the sheath 105 and are secured to the latter by, for example, welding. The ring-shaped spacers 109 may be provided in both surfaces thereof with water passage grooves 119a as in the case of the central spacer 108.

In operation, as shown in FIG. 50, the reactor water is introduced into the sheath 105 through passage holes 122a, 122b formed in the wall of the sheath and then flows along the water gap 110 and the water passages 111 so as to carry away the heat generated in the neutron absorber plates 130b, while serving also as the moderator. The water then comes out of the control blade through passage holes 122a, 122b formed in an upper portion of the wing 107.

The control blade 100D of this embodiment, therefore, is a hybrid-type control blade which employs both a plate-like neutron absorber 130 made of a sheet of hafnium and an elongated hafnium bar 140 provided along the outer edge of each wing 107. In consequence, the mechanical strength of the control blade as a whole is improved and the durability of the control blade against any external force is improved. Thus, the control blade of this embodiment is suitable for use in nuclear reactors which are designed for a long-term operation.

In this embodiment, the reactor water as the coolant can be distributed to every portions in the control blade by virtue of the water passages 111 formed between the outer surfaces of the neutron absorber plates 130b and the adjacent inner surfaces of the sheath 105. In consequence, any damage of the sheath 105 due to local heating of the neutron absorber plates 130b can be avoided advantageously. In addition, the outer surfaces of the neutron absorber plates 130b and the inner surfaces of the sheath 105 are spaced apart from each other across the water passage 111 preserved by the end spacers 145, central spacer 108 and the ring-shaped spacers 109. It is therefore possible to suppress electrochemical corrosion which otherwise may be caused due to direct contact between two different metallic materials, so that the control blade 100D can operate for a along period of time in the sound state.

Figure 53:
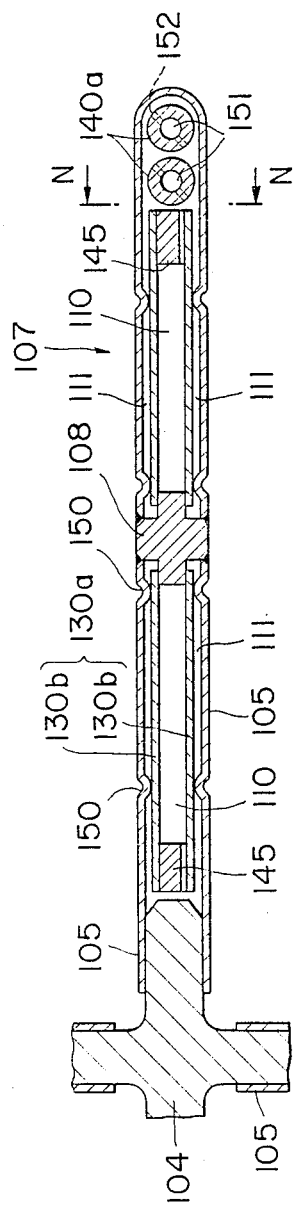
FIG. 53 is another hybrid-type nuclear reactor control blade embodying the present invention.

A different nuclear reactor control blade, which also is of hybrid type, will be described hereinunder with reference to FIG. 53.

This control blade incorporates an elongated hollow hafnium bar or tube 140a disposed along the outer edge of each wing 107 so as to extend in the axial direction of the wing 107.

In this case, the central bore 151 in the elongated hafnium bar 140a provides a passage for the water as the moderator. The water flowing through this passage exhibits a certain degree of neutron absorbing effect thus substituting for the hafnium. It is therefore possible to appreciably reduce the total weight of hafnium employed in the control blade. It is possible to form a multiplicity of apertures in the wall of the hafnium bar 140a so as to diversify the flow paths of the moderator and so as to reduce the flow resistance, thus attaining higher cooling efficiency.

In another form of this embodiment, a plurality of dimples 150 are formed in the walls of the sheath 105 such that the reverse side of the dimples project inward into contact with the adjacent neutron absorber plates 130b so as to serve as spacers which keep the outer surfaces of the neutron absorber plates 130b away from the inner surfaces of the sheath thereby preserving a predetermined distance of passages 111 therebetween.

Figure 54:
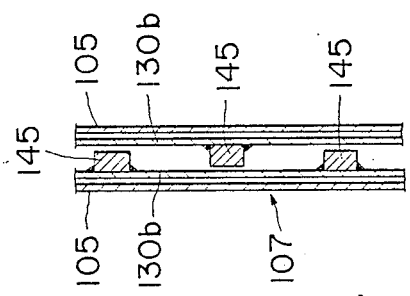
FIG. 54 is a sectional view taken along the line N—N of FIG. 53.

In this embodiment, the end spacers 145 is required only to determine the width of the water gap 110 formed between opposing neutron absorber plates 130b at the center of the sheath. The end spacer, therefore, can have a simple form which is easy to machine. This embodiment offers an advantage in that the ring-like spacers 109 for determining the width of the water passages 111 can be dispensed with so that the assembly of the wing 107 can be simplified. It will be noted also that this embodiment employs a plurality of end spacers 145 provided between the opposing neutron absorber plates at their both ends, at a predetermined interval in the axial direction of the wing 107 as will be seen from FIG. 54. Each end spacer 145 is fixed by, for example, welding only to one of the opposing neutron absorber plates 130b, 130b. It is, therefore, possible to avoid any deformation of both neutron absorber plates in the event that one of these neutron absorber plates is accidentally deformed by an unexpected reason.

Thus, the described embodiments of the nuclear reactor control blade, designed as hybrid type control blades, can exhibit improved structural strength by virtue of the provision of elongated hafnium members along the outer edges of the wings, so that the control blade as a whole exhibits a greater resistance to external force. This offers a higher reliability of operation of the nuclear reactor despite earthquakes and scramming operations which are expected to occur or be executed for many times during long-term operation of the nuclear reactor.

In addition, the coolant can effectively distributed to every portions in the control blade by virtue of the provision of the water passages between the outer surfaces of the neutron absorbers and the adjacent inner surfaces of the sheath, so that the risk of the sheath or the neutron absorber plates being damaged by local overheating is avoided advantageously. Furthermore, the water passages serve to keep the neutron absorber plates away from the inner surfaces of the sheath so that any electrochemical corrosion, which may otherwise be caused due to direct contact between different metallic materials can be eliminated advantageously, whereby the soundness of the nuclear reactor control blade can be maintained for a long period of time.

Figure 55:
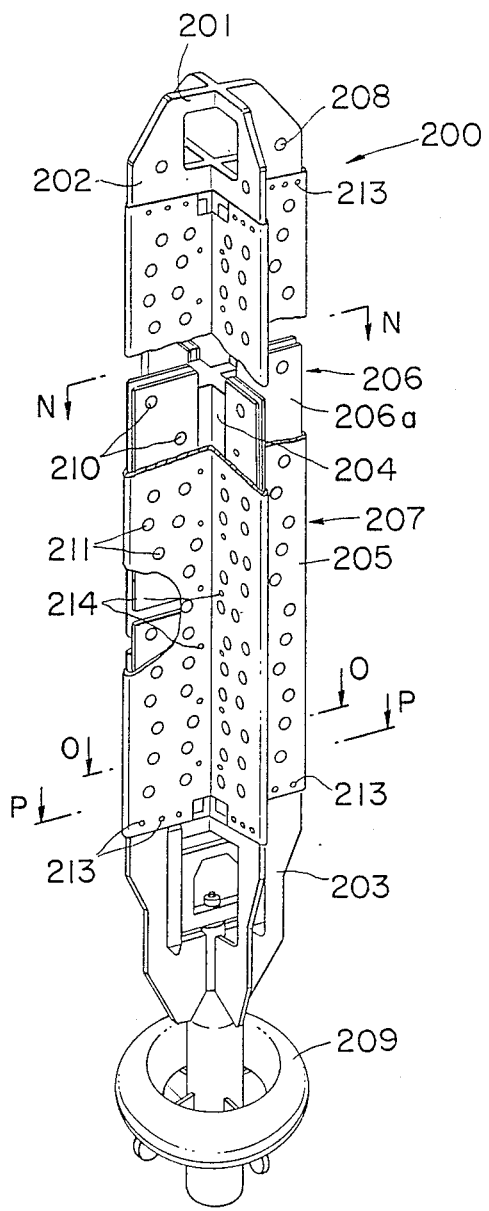
FIG. 55 is a perspective view of a different embodiment of the nuclear reactor control blade in accordance with the present invention.

A description will be made hereinunder as to an embodiment of a flux-trap type control blade for boiling water reactors in accordance with the present invention, which is specifically designed to reduce the weight of the sheath and to prevent any tendency for buckling, with specific reference to FIG. 55.

This control blade, generally designated by a numeral 200, has an upper structure 202 provided with a handle 201, a lower structure 203, and a central tie rod 204 having a cross-shaped cross-section and integrally interconnecting the upper and lower structures 202 and 203. A sheath 205 having a U-shaped cross-section is fixed to each of four projections of the central tie rod 204. The sheath accommodates a long-life neutron absorber 206 made of hafnium plate. The sheath 205 and the neutron absorber 206 in combination constitute a wing 207. Thus, the control blade 200 as a whole has four such wings 207. Guide rollers 208 for guiding the movement of the control blade into and out of the reactor core are provided on both sides of the portion of the upper structure 202 corresponding to each wing 207, while the lower structure 203 is provided with a speed limiter 209.

Figure 56:
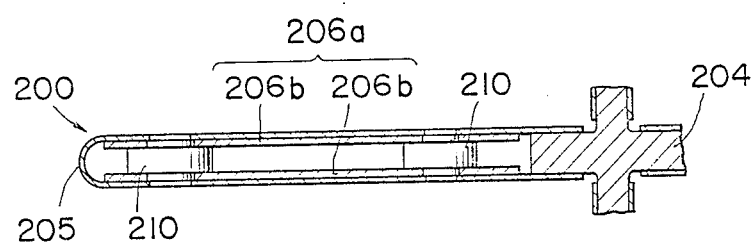
FIGS. 56 to 58 are cross-sectional views taken along the lines N—N to P—P, respectively, of FIG. 55.
Figure 57:
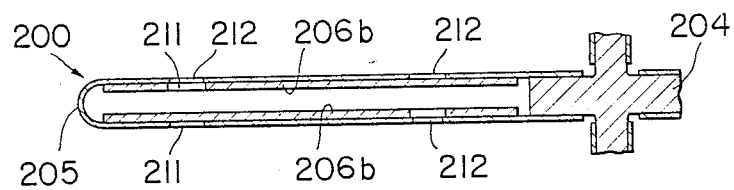
Figure 58:
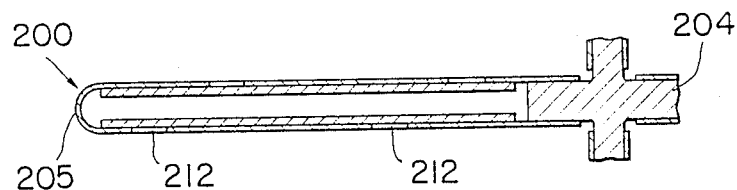

The neutron absorber 206 is divided into a plurality of stages or neutron absorber element 206a in the direction of the axis of the central tie rod 204. As will be seen from FIG. 56, each neutron absorber element 206a is constituted by a pair of opposing neutron absorber plates or sheets 206b accommodated by the sheath 205. A plurality of spacers 210 are disposed between these neutron absorber plates at suitably dispersed locations, so as to form a water gap of a predetermined width between these neutron absorber plates 206a. The spacers 210 also serve to reinforce the wing. As will be seen from FIGS. 55 and 57, water passage holes 211 are formed in the walls of the sheath 205 and in the neutron absorber plates 206b so as to introduce the flow of a moderator (coolant) into the water gap between two neutron absorber plates. The sheath 205 also is provided with water passage holes 212 adapted for guiding the flow of the moderator into channels defined between the neutron absorber plates 206b and the adjacent surfaces of the sheath. Furthermore, water passage holes 213 adjacent the upper structure are formed in a portion of the sheath 205 near the upper end thereof, while water passage holes 213 adjacent to the lower structure are formed in a portion of the sheath 205 near the lower end thereof. The sheath 205 is further provided at a portion near the inner end thereof with water passage holes 214 adjacent to the tie rod.

Figure 59:
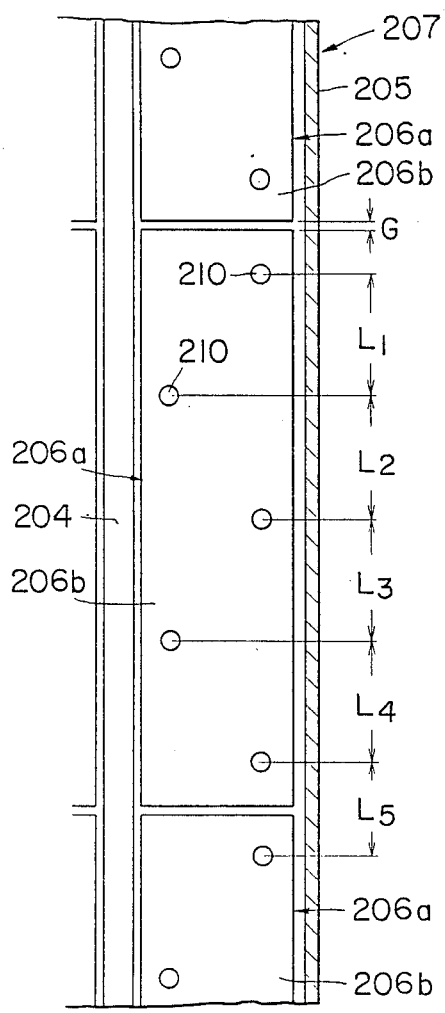
FIG. 59 is a vertical sectional view of the embodiment shown in FIG. 55, illustrating the manner in which the neutron absorber plate is divided.

The neutron absorber plates 206b are made of hafnium, while the sheath 205 and the central tie rod 204 are made of a stainless steel. The neutron absorber plates 206b, therefore, exhibit a different value of thermal expansion coefficient from that of other structural members. In order to absorb any difference in the amount of thermal expansion due to the difference in the thermal expansion coefficient between the neutron absorber plates 206b and other structural members, the neutron absorber element 206a is sectioned into a plurality of sections in the longitudinal directions, i.e., in the vertical direction, as shown in FIG. 59, and a gap G for absorbing the difference in the amount of thermal expansion is formed between the neutron absorber plates 206b, 206b of the adjacent sections.

In order to compensate for any reduction in the mechanical strength due to the presence of the gaps G formed as a result of division of the neutron absorber plate, the spacers 210 are disposed in a staggered manner in the direction of axis of the central tie rod 204 in such a manner as to meet the following condition:

$$L_1 = L_2 = L_3 = L_4 > L_5$$

where, $L_1$, $L_2$, $L_3$ and $L_4$ represent the pitch of the spacers within each section 206a, 206a, 206a . . . , while $L_5$ represents the distance between adjacent spacers of the adjacent two sections.

Considering that each wing exhibits a smaller mechanical strength at the free end portion than at the central or inner portion which is stiffened by the central tie rod 204, it is advisable that the number of the spacers is selected to be larger in the end portion of each wing than in the central or inner portion. For instance, in the embodiment shown in FIG. 59, each section of the neutron absorber plate has two spacers at its inner region and three spacers at its outer region.

Figure 60:
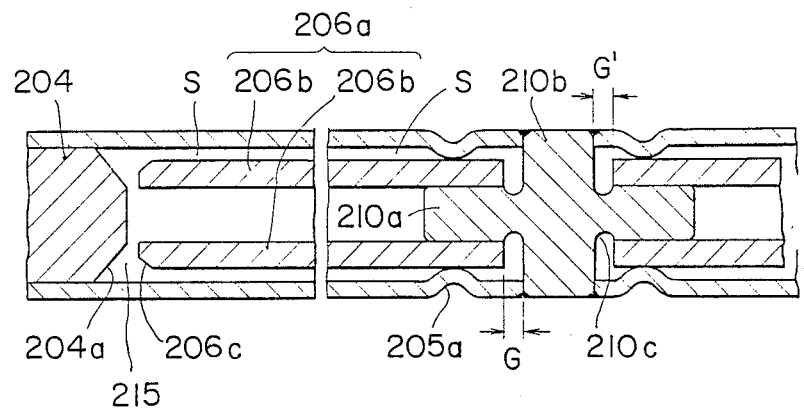
FIG. 60 is a cross-sectional view of a different embodiment of the present invention.

The clearance of channel S between the each wall of the sheath and the adjacent neutron absorber plate 206b is intended for preventing any stagnation of water. This channel S can be formed by dimpling the wall of the sheath 205 inwardly in a depth of 0.2 to 0.3 mm as at 205a, as shown in FIG. 60. The pitch of the dimpling 205a is, for example, about 10 cm in the axial direction of the central tie rod. The channel S preserved by such dimpling has such a size that the water in this channel is replaced in one to several days. The channel S may be formed by other means than the described dimpling, e.g., by employing a washer-like spacers of the type shown in FIG. 36. The water passage holes 213 and 214 effectively prevent the water from stagnating in the regions near the upper structure 202, end structure 203 and the central tie rod 204.

The side edges of the central tie rod and the corners of the neutron absorber plate 206b adjacent to the central tie rod are chamferred as at 204a and 206c, as shown in FIG. 60, thereby reducing the resistance encountered by the flow of water.

The spacer 210 used in this embodiment may be of the type which is shown in FIGS. 37A, 37B and 37C. Namely, the spacer 210 has a disk-shaped seat portion 210a and mounting leg portions 210a projecting from both sides of the seat portion 210a. Grooves 210c of a suitable number and depth are formed in both surfaces of the disk-shaped seat portion 210a in a crossing form as shown in FIG. 37B, in such a manner as not to cause any significant reduction in the strength of the spacer 210. As will be readily understood from FIG. 60, the grooves 210c serve to provide communication between the inner and outer surfaces of each neutron absorber plate. The mounting leg portions 210b of the spacer 210 fit in mounting holes 206a provided in the neutron absorber plates 206a such as to leave a gap G', so as to enable any difference in the thermal expansion to be absorbed.

Figure 61:
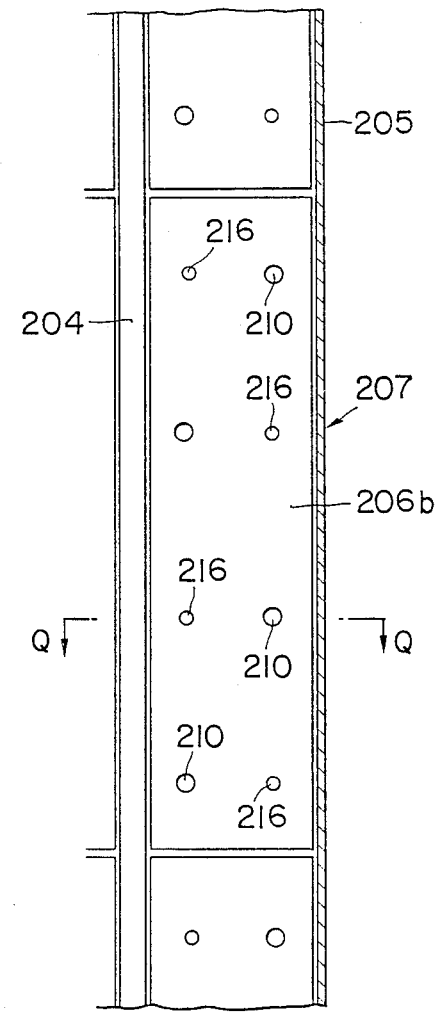
FIG. 61 is a vertical sectional view of a different embodiment of the present invention.
Figure 62:
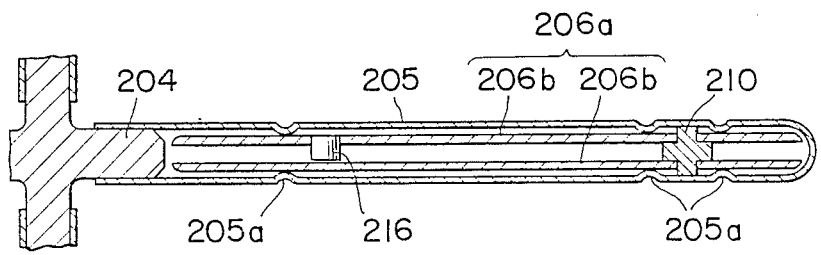
FIG. 62 is a sectional view taken along the line Q—Q of FIG. 61.

It is possible to substitute some of the spacers 210 by hafnium spacers 216 as shown in FIG. 61. Each hafnium spacer is fixed to either one of the opposing plate by, for example, shrink fit or welding, and has a height or thickness that the other end thereof touches the inner surface of the opposing neutron absorber plate, as will be seen from FIG. 62.

Figure 63:
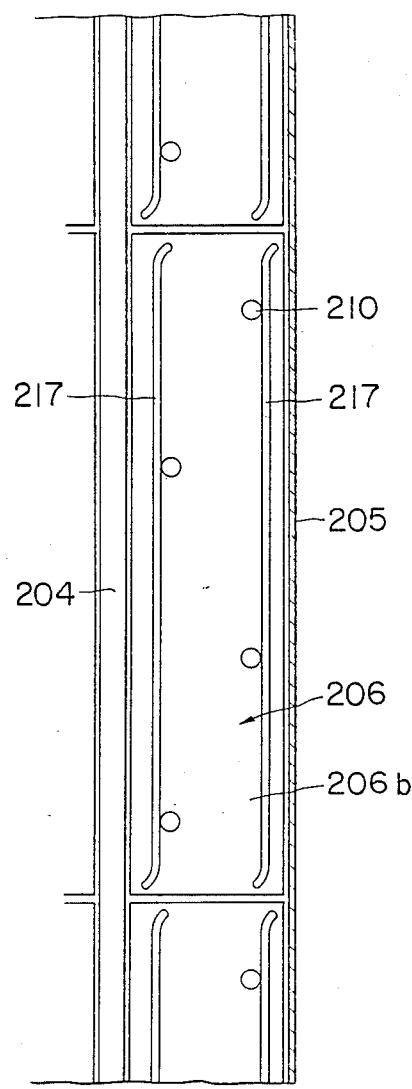
FIG. 63 is a vertical sectional view of a modification of the embodiment shown in FIG. 55.
Figure 66:
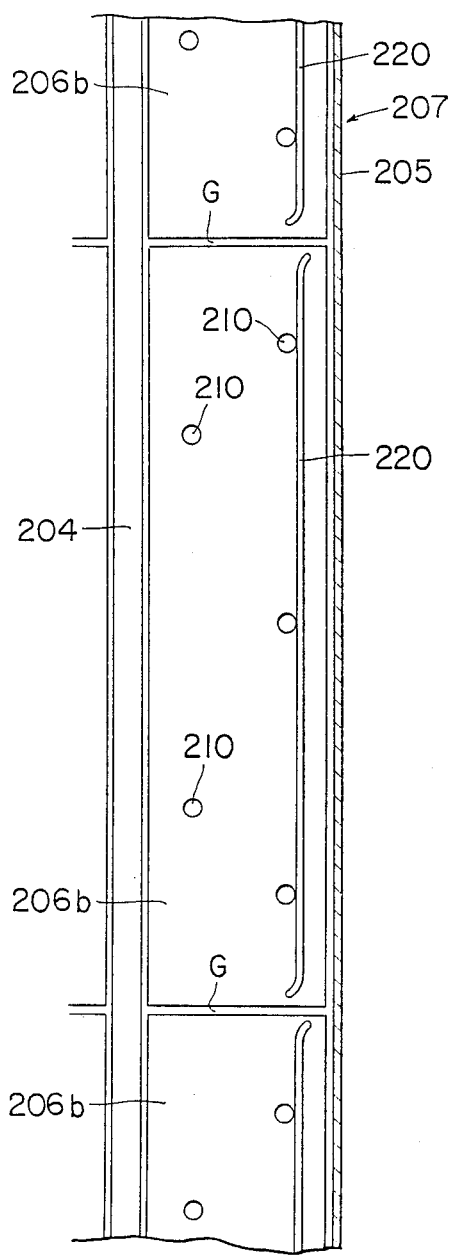
FIG. 66 is a vertical sectional view taken along the line S—S of FIG. 65.

It is also possible to use, as the spacer, a wire-type spacer 217 made of stainless steel and having a diameter of 3 to 5 mm, as shown in FIG. 63. These wire-type spacers are fixed to the spacers 210 so as to stiffen the wing of the control blade against lateral bending force, while preserving the gap G' between the opposing neutron absorber plates. Although the illustrated embodiment employs only two wire-type spacers, the number of the wire-type spacers may be increased or decreased as occasion demands.

The control blade of this embodiment exhibits a long life by virtue of the use of hafnium which is a typical long-life neutron absorbing material.

The neutron absorber is arranged in the form of flat sheets or plates such as to form, between the opposing neutron absorber plates, a water gap into which water serving as a coolant and a moderator is introduced. Both the neutron absorber plates and the water serve to enhance the reactivity worth, so that the control blade as a whole can exhibit a large value of the reactivity worth. Alternatively, for attaining a required level of reactivity worth, the amount of expensive hafnium having a large density (13.3 g/cm³) may be reduced.

In addition, the spacers in each wing are dispersed in the region near the central tie rod and in the region remote from the central tie rod, so that a linear flow passage extending in the axial direction of the central tie rod is formed between both neutron absorber plates in the central region thereof. These spacers are arranged in a staggered manner substantially at a constant interval such that the distance between the two adjacent spacers on different neutron absorber plates is slightly smaller than the axial pitch of the spacers in each neutron absorber plate. In consequence, the wing exhibits a substantially uniform distribution of strength against lateral bending force over its entire length.

Figure 64:
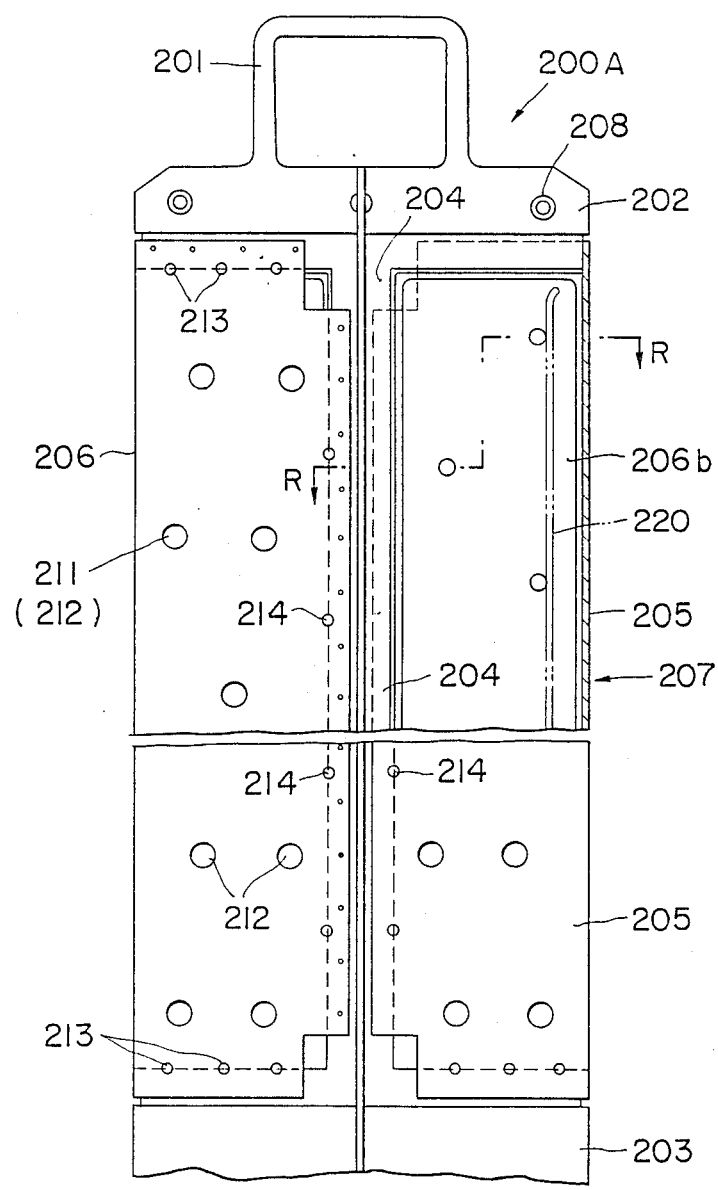
FIG. 64 is a front elevational view of another modification of the embodiment shown in FIG. 55.

FIG. 64 shows another form of the flux-trap-type control blade embodying the present invention. This control blade, generally denoted by a numeral 200A, is basically the same as the control blade 200 shown in FIG. 55 so that the same parts or members as those in the control blade 200 are denoted by the same reference numerals and detailed description thereof is omitted.

The construction of the control blade 200A is shown in detail in FIGS. 64 to 67. The control blade 200A has four wings 207 each having a plurality of spacers 210 which may be of the same type as that used in the control blade 200 explained before. These spacers 210 are arranged at a higher density in the outer region of the wing than at the inner or central region which is stiffened by the central tie rod 204. For instance, in the embodiment shown in FIG. 66, three spacers 210 are disposed in the outer region, while the inner region employs two spacers. Preferably, a wire-type spacer 220 is disposed in the region near the outer end of the wing. The wire-type spacer is fixed t the spacers 210 by, for example, welding.

The clearance of channel S between the each wall of the sheath 205 and the adjacent neutron absorber plate 206b is intended for preventing any stagnation of water. This channel S can be formed by dimpling the wall of the sheath 205 inwardly in a depth of 0.2 to 0.3 mm as at 205a, as shown in FIGS. 65 and 67. The channel S preserved by such dimpling has such a size that the water in this channel is replaced in one to several days. The channel S may be formed by other means than the described dimpling, e.g., by employing a washer-like spacers (not shown). The water passage holes 213 to 214 effectively prevent the water from stagnating in the regions near the upper structure 202, end structure 203 and the central tie rod 204.

The side edges of the central tie rod and the corners of the neutron absorber plate 206b adjacent to the central tie rod are chamferred as at 204a and 206c, as shown in FIG. 60, thereby reducing the resistance encountered by the flow of water.

The spacer 210 used in this embodiment may be of the type which is shown in FIGS. 37A, 37B and 37C. The mounting leg portions 210b of the spacer 210 fit in mounting holes 206a provided in the neutron absorber plates 206a such as to leave a gap G', so as to enable any difference in the thermal expansion to be absorbed.

Figure 68:
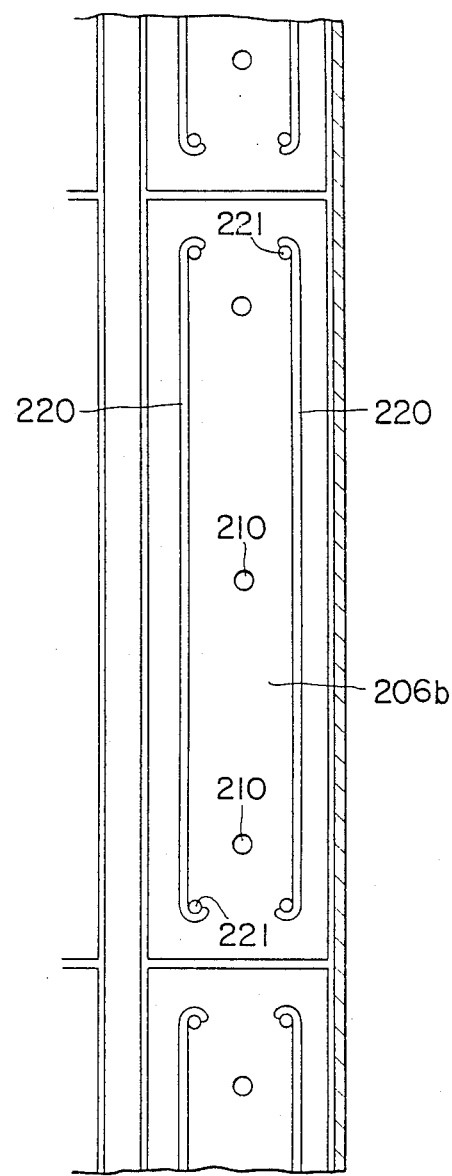
FIG. 68 is a vertical sectional view of a different embodiment of the nuclear reactor control rod in accordance with the present invention.

It is possible to substitute some of the spacers 210 by hafnium spacers 221 as shown in FIG. 68. Each hafnium spacer is fixed to either one of the opposing plate by, for example, shrink fit or welding, and has a height or thickness that the other end thereof touches the inner surface of the opposing neutron absorber plate.

The embodiment shown in FIG. 68 employs two wire-type spacers 220 for each neutron absorber plate 206b. These wire-type spacers are fixed at their upper and lower ends to the hafnium spacers 221. The wire-type spacer is constituted by a hafnium wire of a diameter ranging from 3 mm to 5 mm, and provides a reinforcement to the wing of the control blade against lateral bending force, while preserving the gap G' between the opposing neutron absorber plates 206a, 206a.

It is possible to use spacers made of a stainless steel, in place of the hafnium spacers 221. In such a case, the wire-type spacers 220 also are preferably made of a stainless steel, from the view point of easiness of welding.

In the control blade of the described embodiment, the neutron absorber is arranged in the form of flat plates such that a gap for guiding the flow of water, serving as a moderator and a coolant, is defined between the opposing neutron absorber plates. Both the neutron absorber plates and the water in the water gap serve to enhance the reactivity worth, so that the control blade as a whole can exhibit a large value of reactivity worth. Alternatively, the amount of expensive hafnium having a high density (13.3 g/cm$^3$) is reduced for attaining a given reactivity worth.

In addition, the wire-type spacers arranged to extend in the axial direction of the central tie rod, together with the spot-like spacers dispersed over the entire region of the neutron absorber plates, serve to increase the strength of each wing of the control blade against bending external force.

Although preferred embodiments of the nuclear reactor control blade of the invention have been described, it is to be noted that these embodiments are only illustrative and various changes and modifications may be imparted thereto without departing from the scope of the invention which is limited solely by the appended claims.

What is claimed is:

1. A control blade for use in nuclear reactors comprising:
   an upper structure means;
   a lower structure means;
   a central tie rod means for connecting integrally said upper and lower structure means together, having radial projections so as to exhibit a substantially cross-shaped cross-section;
   a sheath plate means having a substantially U-shaped cross-section and secured to the end of each projection of said central tie rod means; and
   neutron absorber means charged in each of said sheath plate means;
   said neutron absorber means being divided into a plurality of neutron absorber elements along the axis of said central tie rod means, each neutron absorber element being composed of a pair of neutron absorber plates or sheets spaced from and opposing each other;
   a supporting spacer means disposed for supporting said opposing neutron absorber plates; and
   a water gap for guiding the flow of a moderator defined between said neutron absorber plates, wherein said supporting spacer means comprises a plurality of supporting spacers disposed between said opposing neutron absorber plates, each of said supporting spacers including a spacing portion engaging with inner surfaces of said opposing neutron absorber plates and supporting portions projecting from centers of both ends of the spacing portions, said opposing neutron absorber plates being provided with holes in such a manner that said supporting portions of said spacers loosely penetrate said holes of said absorber plates and are secured to walls of said sheath plate means.

2. A control blade for use in nuclear reactors according to claim 1, wherein the thicknesses of said neutron absorber elements are so varied that the thickness of the whole neutron absorber means is progressively decreased along the length of said control blade means from the end near said upper structure towards means the end near said lower structure means, whereby the neutron absorption characteristics are progressively decreased along the length of said control blade means from the end near said upper structure means towards the end near said lower structure means.

3. A control blade for use in nuclear reactors according to claim 2, wherein the variation of the thicknesses of said neutron absorber elements is conducted such that the reduction in the thickness of the whole neutron absorber means is effected in a stepped manner along the length of said control blade means from the end near said upper structure means towards the end near said lower structure means.

4. A control blade for use in nuclear reactors according to claim 1, wherein the neutron absorption characteristics are varied at least in the neutron absorber element adjacent to said upper structure means, such that the end of said neutron absorber element remote from said central tie rod means exhibit greater neutron absorption than other portions of said neutron absorber element.

5. A control blade for use in nuclear reactors according to claim 1, wherein said neutron absorber elements are engaged and supported by supporting protrusions protruding from each of said central tie rod means at a predetermined spacing in the direction of axis of said central tie rod means.

6. A control blade for use in nuclear reactors according to claim 1, wherein an auxiliary handle is provided in said neutron absorber element adjacent to said upper structure means, at a portion near said central tie rod means.

7. A control blade for use in nuclear reactors according to claim 1, wherein water passage holes are formed in corresponding portions of the walls of said sheath plate means and said neutron absorber plates so as to allow a moderator to be introduced into said water gap.

8. A control blade for use in nuclear reactors according to claim 1, wherein said neutron absorber plate or sheet is made of a metallic neutron absorber plate or sheets, the opposing neutron absorber plates being spaced from each other by spacers which serve to preserve said water gap between said opposing neutron absorber plates.

9. A control blade for use in nuclear reactors according to claim 1, wherein said neutron absorber element includes a plurality of metallic neutron absorber plates or sheets disposed such as to oppose to each other in the thicknesswise direction of said wing, said neutron absorber plates being spaced from each other and held by supporting spacers so as to define therebetween said water gap.

10. A control blade use in nuclear reactors according to claim 1, wherein adjacent neutron absorber elements are partially overlapped at their adjacent ends.

11. A control blade for use in nuclear reactors according to claim 1, wherein the linear gap formed between adjacent neutron absorber elements is covered by the neutron absorber plate or sheet which opposes to this gap in the direction of thickness of said wing.

12. A control blade use in nuclear reactors according to claim 1, wherein the linear gaps formed between the respective adjacent neutron absorber elements are so positioned that they do not occupy the same horizontal plane.

13. A control blade for use in nuclear reactors according to claim 1, wherein said spacers are arranged in a zig-zag or staggered manner in the direction of axis of said central tie rod means.

14. A control blade for use in nuclear reactors according to claim 1, wherein each of the linear gaps formed the neutron absorber plates or sheets of adjacent neutron absorber elements is masked by the opposing neutron absorber plate.

15. A control blade for use in nuclear reactors according to claim 1, wherein said neutron absorber plate is a hafnium metal plate.

16. A control blade for use in nuclear reactors according to claim 1, wherein said sheath plate means is locally and inwardly dimpled so as to form a water passage between the inner surface of each wall of said sheath plate means and the outer surface of the adjacent neutron absorber plate, and wherein said central tie rod means is chamferred at its side surfaces, said sheath plate means being provided with water passage holes dispersed in the vicinity of the chamferred portion of said central tie rod means.

17. A control blade for use in nuclear reactors according to claim 1, wherein the side surfaces of said upper and lower structure means facing said neutron absorber plates or sheets are chamferred and said sheath plate means is provided with water passage holes dispersed in the vicinity of the chamferred portions of said upper and lower structure means.

18. A control blade for use in nuclear reactors according to claim 1, wherein said water gap between the opposing neutron absorber plates or sheets is preserved by wire-type spacers disposed between said neutron absorber plates.

19. A control blade for use in nuclear reactors according to claim 1, wherein wire-type spacers are disposed between said opposing neutron absorber plates or sheets in the region near the outer end of said wing, so as to extend in the direction of axis of said central tie rod means.

20. A control blade according to claim 1, wherein said sheath plate means are provided with holes located in alignment with corresponding holes of said opposing absorber plates respectively so that said supporting portions of said supporting spacers loosely penetrating the holes of the neutron absorber plates are fitted in the holes formed in the walls of said sheath plate means to be secured thereto so as to provide outer flat surfaces for said sheath plate means.

21. A control blade according to claim 1, wherein washer-like members are further disposed between said sheath plate means and said neutron absorber plates in a loose engagement with said supporting portions of said supporting spacer means.

22. A control blade according to claim 1, wherein said supporting spacers are disposed between said opposing neutron absorber plates with substantially equal intervals in a widthwise direction of each of said sheath plate means.

23. A control blade according to claim 1, wherein said supporting spacers are disposed between said opposing neutron absorber plates with substantially constant intervals in an axial direction of said central tie rod means, the intervals being slightly reduced between adjacent spacer means belonging to adjacent neutron absorber elements.

* * * * *

UNITED STATES PATENT AND TRADEMARK OFFICE
CERTIFICATE OF CORRECTION

PATENT NO. : 4,876,060

DATED : OCTOBER 24, 1989

INVENTOR(S) : RITSUO YOSHIOKA; MAKOTO UEDA; YOICHI MOTORA; and MITSUHARU NAKAMURA It is certified that error appears in the above-identified patent and that said Letters Patent is hereby corrected as shown below: ON THE TITLE PAGE:

Third inventor's name should be --Yuichi Motora--

In the Abstract of the Disclosure, line 10, change "convertional" to --conventional--;

Column 8, line 62, after "$18a_1$", insert --,--; and also after "example", insert --,--;

Column 14, line 17, change "16Ab" to --18Ab--;

Column 15, line 21, change "herein under" to --hereinunder--;

Column 15, line 26, change "FIGS." to --FIG.--;

Column 15, line 61, change "chaffering" to --chamferring--;

Column 15, line 64, change "chamfering" to --chamferring--;

Column 19, line 51, change "shut down" to --shut-down--;

Column 20, line 29, change "nd" to --and--;

Column 22, line 21, change "restrains" to --restrain--;

Column 22, line 68, change "7" to --107--;

Column 23, line 47, change "45" to --145--;

Column 24, line 25, change "portions" to --portion--;

Column 24, line 39, change "along" to --long--;

Column 24, line 42, change "hybrid type" to --hybrid-type--;

UNITED STATES PATENT AND TRADEMARK OFFICE
CERTIFICATE OF CORRECTION

PATENT NO.  :  4,876,060

DATED       :  OCTOBER 24, 1989

INVENTOR(S) :  RITSUO YOSHIOKA; MAKOTO UEDA; YOICHI MOTORA; and MITSUHARU NAKAMURA It is certified that error appears in the above-identified patent and that said Letters Patent is hereby corrected as shown below:

Column 25, line 19, change "hybrid type" to --hybrid-type--;

Column 25, line 29, after "can", insert --be--;

Column 26, line 61, after "between", delete "the";

Column 28, line 25, change "t" to --to--;

Column 28, line 27, after "between", delete "the";

Column 28, line 36, delete "a";

Column 30, line 54, after "blade", insert --for--;

Column 30, line 62, after "blade", insert --for--.

Signed and Sealed this

Tenth Day of March, 1992

Attest:

HARRY F. MANBECK, JR.

*Attesting Officer*   *Commissioner of Patents and Trademarks*